United States Patent
Kitazato et al.

(10) Patent No.: US 9,661,387 B2
(45) Date of Patent: May 23, 2017

(54) RECEIVING APPARATUS, RECEPTION METHOD, TRANSMITTING APPARATUS, TRANSMISSION METHOD, AND PROGRAM

(71) Applicant: SONY CORPORATION, Tokyo (JP)

(72) Inventors: Naohisa Kitazato, Tokyo (JP); Yoshiharu Dewa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/126,713

(22) PCT Filed: Apr. 25, 2013

(86) PCT No.: PCT/JP2013/062166
§ 371 (c)(1),
(2) Date: Dec. 16, 2013

(87) PCT Pub. No.: WO2013/168581
PCT Pub. Date: Nov. 14, 2013

(65) Prior Publication Data
US 2014/0173665 A1    Jun. 19, 2014

(30) Foreign Application Priority Data
May 10, 2012    (JP) .................................. 2012-108135

(51) Int. Cl.
*H04N 5/445* (2011.01)
*H04N 21/462* (2011.01)
(Continued)

(52) U.S. Cl.
CPC .......... *H04N 21/462* (2013.01); *H04H 60/13* (2013.01); *H04H 60/82* (2013.01);
(Continued)

(58) Field of Classification Search
None
See application file for complete search history.

(56) References Cited

U.S. PATENT DOCUMENTS 7,711,250 B2 *   5/2010   Choi et al. ..................... 386/241
7,716,713 B1     5/2010   Ryu et al.
(Continued)

FOREIGN PATENT DOCUMENTS

EP      2073538 A1 *   6/2009   .............. H04N 5/76
JP      2003-230111 A    8/2003
(Continued)

OTHER PUBLICATIONS

ETSI TS 101154 V1.9.1 Digital Video Broadcasting (DVB); Specification for the use of Video and Audio coding in Broadcasting Applications based on MPEG-2 Transport Stream.*
(Continued)

*Primary Examiner* — Fernando Alcon
(74) *Attorney, Agent, or Firm* — Chip Law Group

(57) ABSTRACT

The present invention relates to a receiving apparatus, a reception method, a transmitting apparatus, a transmission method, and a program that enable data broadcasting content and an application program executed in linkage with the broadcasting content to be started according to priorities.

An application adjusting unit acquires priority information showing priorities of starts between data broadcasting content transmitted by a broadcasting wave of digital broadcasting and one or more linked applications executed in linkage with the broadcasting content transmitted by the broadcasting wave and determines the priorities of the starts. A data broadcasting engine or an application engine starts the data broadcasting content or the linked application having the high priority, according to a determination result of the priorities by the application adjusting unit. The present invention can be applied to a television receiver that receives the broadcasting wave of the digital broadcasting.

10 Claims, 13 Drawing Sheets

(51) Int. Cl.
| | |
|---|---|
| H04H 60/13 | (2008.01) |
| H04H 60/82 | (2008.01) |
| H04N 21/236 | (2011.01) |
| H04N 21/2362 | (2011.01) |
| H04N 21/434 | (2011.01) |
| H04N 21/61 | (2011.01) |
| H04N 21/6543 | (2011.01) |
| H04N 21/81 | (2011.01) |
| H04N 21/8543 | (2011.01) |
| H04N 21/8545 | (2011.01) |

(52) U.S. Cl.
CPC ... *H04N 21/2362* (2013.01); *H04N 21/23605* (2013.01); *H04N 21/4343* (2013.01); *H04N 21/4345* (2013.01); *H04N 21/4622* (2013.01); *H04N 21/6125* (2013.01); *H04N 21/6543* (2013.01); *H04N 21/8173* (2013.01); *H04N 21/8543* (2013.01); *H04N 21/8545* (2013.01)

(56) References Cited

U.S. PATENT DOCUMENTS

| | | | |
|---|---|---|---|
| 2004/0226049 A1* | 11/2004 | Shiomi | 725/131 |
| 2005/0015802 A1 | 1/2005 | Masson | |
| 2005/0047596 A1* | 3/2005 | Suzuki | 380/239 |
| 2006/0150172 A1* | 7/2006 | Heath | G06F 8/20 717/162 |
| 2007/0050808 A1 | 3/2007 | Matsuyama et al. | |
| 2007/0091881 A1* | 4/2007 | Kallio et al. | 370/389 |
| 2008/0056299 A1* | 3/2008 | Kim | 370/465 |
| 2009/0037792 A1* | 2/2009 | Choi et al. | 714/755 |
| 2011/0093895 A1* | 4/2011 | Lee | H04N 21/4432 725/40 |
| 2011/0162021 A1* | 6/2011 | Lee | 725/93 |
| 2011/0167468 A1* | 7/2011 | Lee et al. | 725/132 |
| 2012/0106921 A1* | 5/2012 | Sasaki et al. | 386/230 |
| 2014/0089994 A1* | 3/2014 | Fujisawa | H04N 21/443 725/86 |

FOREIGN PATENT DOCUMENTS

| | | |
|---|---|---|
| JP | 2003230111 A1 | 8/2003 |
| JP | 2004-104415 A | 4/2004 |
| JP | 2008-543121 A | 11/2008 |
| JP | 2010-004498 A | 1/2010 |
| JP | 2011-66556 A | 3/2011 |
| JP | 2015-180065 A | 8/2015 |
| WO | 2004-034698 A1 | 4/2004 |
| WO | 2013-154023 A1 | 10/2013 |

OTHER PUBLICATIONS

Machine Translation extracted from: http://www19.ipdl.inpit.go.jp/PA1/cgi-bin/PA1INIT?1418335426638, pp. 1-23 Detailed description of Shuntaro et al. (JP 2003-230111).*
Patent Abstracts of Japan, Abstract for Shuntaro et al. (JP 2003-230111).*
International Search Report issued Aug. 6, 2013 in PCT/JP2013/062166.
Kazuhiro Otsuki, et al., "A Method of Controlling Presentation for Applications in Hybridcast", ITE Technical Report, vol. 36, No. 7, Feb. 9, 2012, pp. 29-32 with cover pages.
Japanese Office Action issued Apr. 8, 2014, in Japan Patent Application No. 2013-520309 (with English translation).
Translation of Office Action for patent No. 2014-256727, applicant Takashi Nishikawa, dispatch No. 097417, dispatch date Mar. 3, 2015.
Translation of Office Action for patent No. 2014-256727, applicant Takashi Nishikawa, dispatch No. 097418, dispatch date Mar. 3, 2015.
Translation of Office Action for patent No. 2014-256727, applicant Takashi Nishikawa, dispatch No. 097419, dispatch date Mar. 3, 2015.
Translation of Office Action for patent No. 2014-256725, applicant Takashi Nishikawa, dispatch No. 097421, dispatch date Mar. 3, 2015.
Translation of Office Action for patent No. 2014-256725, applicant Takashi Nishikawa, dispatch No. 097422, dispatch date Mar. 3, 2015.
Translation of Office Action for patent No. 2014-256725, applicant Takashi Nishikawa, dispatch No. 097423, dispatch date Mar. 3, 2015.
Translation of Office Action for patent No. 2014-256726, applicant Takashi Nishikawa, dispatch No. 097424, dispatch date Mar. 3, 2015.
Translation of Office Action for patent No. 2014-256726, applicant Takashi Nishikawa, dispatch No. 097425, dispatch date Mar. 3, 2015.
Translation of Office Action for patent No. 2014-256726, applicant Takashi Nishikawa, dispatch No. 097426, dispatch date Mar. 3, 2015.
Kazuhiro Otsuki, Hisayuki Ohmata, Arisa Fujii, Keigo Majima, Tomoyuki Inoue. "A Method of Controlling Presentation for Application in Hybridcast." ITE Technical Report vol. 96 No. 7 (2012), 8 pages.
"Digital Video Broadcasting (DVB); Signalling and carriage of interactive applications and services in Hybrid broadcast/broadband environments." ETSI TS 102 809 V1.1.1 (Jan. 2010), pp. 19, 35, 50.
Translation of Office Action for patent No. 2014-256725, applicant Takashi Nishikawa, dispatch date Jan. 15, 2015.
Translation of Office Action for patent No. 2014-256726, applicant Takashi Nishikawa, dispatch date Jan. 15, 2015.
Translation of Office Action for patent No. 2014-256727, applicant Takashi Nishikawa, dispatch date Jan. 15, 2015.
Japanese Office Action for patent No. 2014-256727, applicant Takashi Nishikawa, dispatch date Jan. 15, 2015.
Japanese Office Action for patent No. 2014-256726, applicant Takashi Nishikawa, dispatch date Jan. 15, 2015.
Japanese Office Action for patent No. 2014-256725, applicant Takashi Nishikawa, dispatch date Jan. 15, 2015.
Office Action from Japanese Application No. 2013-520309, dated Nov. 11, 2014, 5 pages.
Kazuhiro Otsuki. Hisayuki Ohmata, Arisa Fujii, Keigo Majima and Tomoyuki Inoue. "A Method of Controlling Presentation for Applications in Hybridcast". IEEE International Conference on Consumer Electronics (ICCE) (2012) Japan. p. 323-324.
Digital Video Broadcasting (DVB); Signalling and carriage of interactive applications and services in Hybrid broadcast/broadband environments. ETSI TS 102 809 V1.1.1 (Jan. 2010). 5 pages.
Kazuhiro Otsuki. Hisayuki Ohmata, Arisa Fujii, Keigo Majima and Tomoyuki Inoue. "A Method of Controlling Presentation for Applications in Hybridcast". ITE Technical Report vol. 36, No. 7, Feb. 2012, 8 pages.
European Search Report, Application No. EP13788572, dated Nov. 12, 2014, 9 pages.
2013-520309. Digital Video Broadcasting (DVB); Multimedia Home Platform (MHP) Specification 1.2.2. ETSI TS 102 727 V1.1.1 (Jan. 2010).
2013-520309. Digital Video Broadcasting (DVB); Globally Executable MHP (GEM) Specification 1.2.2 (including IPTV). ETSI TS 102 728 V1.1.1 (Jan. 2010).
2013-520309. Digital Video Broadcasting (DVB); Signalling and carriage of interactive applications and services in Hybrid broadcast/broadband environments. ETSI TS 102 809 V1.1.1 (Jan. 2010).
2014-256727. Digital Video Broadcasting (DVB); Signalling and carriage of interactive applications and services in Hybrid broadcast/broadband environments. ETSI TS 102 809 V1.1.1 (Jan. 2010).
2014-256725. Digital Video Broadcasting (DVB); Signalling and carriage of interactive applications and services in Hybrid broadcast/broadband environments. ETSI TS 102 809 V1.1.1 (Jan. 2010).
OA Document in Japanese. 2013-520309.
OA Document in Japanese. 2014-256725.
OA Document in Japanese. 2014-256727.

(56) References Cited

OTHER PUBLICATIONS

"Digital Video Broadcasting (DVB); Multimedia Home Platform (MHP) Specification 1.2.2", ETSI TS 102 727, V1.1.1, p. 185-197.
"Digital Video Broadcasting (DVB); Globally Executable MHP(GEM) Specification 1.2.2 (including IPTV)", ETSI TS 112 728, V1.1.1, pp. 08.
"Digital Video Broadcasting (DVB); Signalling and carriage of interactive applications and services in Hybrid broadcast/broadband environments", ETSI TS 102 809, V1.1.1, pp. 1-98.
Dffice Action for JP Patent Application No. 2015-078830, issued on Oct. 27, 2016, 5 pages of Office Action and 3 pages of English Translation.

* cited by examiner

FIG. 4

AIT

| DATA STRUCTURE | BIT NUMBER | BIT STRING NOTATION | |
|---|---|---|---|
| application_information_section() { | | | |
|   table_id | 8 | uimsbf | |
|   section_syntax_indicator | 1 | bslbf | |
|   reserved_future_use | 1 | bslbf | |
|   reserved | 2 | bslbf | |
|   section_length | 12 | uimsbf | |
|   application_type | 16 | uimsbf | application_type FORMAT OF APPLICATION TRANSMITTED BY AIT |
|   reserved | 2 | bslbf | |
|   version_number | 5 | uimsbf | |
|   current_next_indicator | 1 | bslbf | |
|   section_number | 8 | uimsbf | |
|   last_section_number | 8 | uimsbf | |
|   reserved_future_use | 4 | bslbf | |
|   common_descriptors_length | 12 | uimsbf | |
|   for(i=0;i<N;i++) { | | | |
|     descriptor() | | | |
|   } | | | |
|   reserved_future_use | 4 | bslbf | |
|   application_loop_length | 12 | uimsbf | |
|   for(i=0;i<N;i++) { | | | |
|     application_identifier() | 8 | uimsbf | APPLICATION IDENTIFIER |
|     application_control_code | 4 | bslbf | APPLICATION CONTROL CODE |
|     reserved_future_use | 12 | uimsbf | |
|     application_descriptors_loop_length | | | |
|     for(j=0;j<M;j++) { | | | |
|       descriptor() | | | |
|     } | | | |
|   } | | | |
|   CRC_32 | 32 | rpchof | |
| } | | | |

FIG. 5

| NAME | ESSENTIAL/OPTION | DESCRIPTION |
|---|---|---|
| APPLICATION TYPE | ESSENTIAL | TYPE OF APPLICATION, HTML5 FIXATION |
| PROVIDER ID | ESSENTIAL | APPLICATION PROVIDER ID |
| APPLICATION ID | ESSENTIAL | APPLICATION IDENTIFIER UNIQUE IN SPECIFIC PROVIDER. |
| APPLICATION CONTROL COMMAND | ESSENTIAL | CONTROL ACTION FOR TARGET APPLICATION<br>· AutoStart   · Kill<br>· Prefetch    · Present |
| APPLICATION SPECIFICATION VERSION | ESSENTIAL | VERSION NUMBER FOR EACH APPLICATION TYPE |
| RECEIVER REQUEST FUNCTION PROFILE | OPTION (DEFAULT ASSUMPTION PRESENCE) | PROFILE VALUE SHOWING RECEIVER FUNCTION REQUESTED BY APPLICATION. IT IS DETERMINED THAT APPLICATION CAN BE USED, AT THE TIME OF MATCHING. |
| APPLICATION URL | OPTION (ESSENTIAL BY COMMAND) | APPLICATION ACQUISITION DESTINATION URL |
| APPLICATION BOUNDARY | OPTION (ESSENTIAL BY COMMAND) | OPERATION RANGE OF APPLICATION |
| APPLICATION SYSTEM PRIORITY | OPTION (DEFAULT ASSUMPTION PRESENCE) | PRIORITIES BETWEEN APPLICATION TYPE AND OTHER APPLICATION TYPES TO BE AUTOMATICALLY STARTED. APPLICATION TYPE OF MAXIMUM VALUE IS AUTOMATICALLY STARTED |
| APPLICATION BROADCASTING LINKAGE RANGE | OPTION (ESSENTIAL BY COMMAND) | LINKAGE OPERATION RANGE OF APPLICATION |
| APPLICATION ALLOWANCE FUNCTION | OPTION | ALLOWED BROADCASTING ASSOCIATED FUNCTION OF APPLICATION |
| APPLICATION PRIORITY | OPTION | PRIORITIES BETWEEN PLURALITY OF APPLICATIONS |
| SERVER ACCESS DISPERSION PARAMETER | OPTION | CONTROL PARAMETER TO DISPERSE SERVER ACCESS |

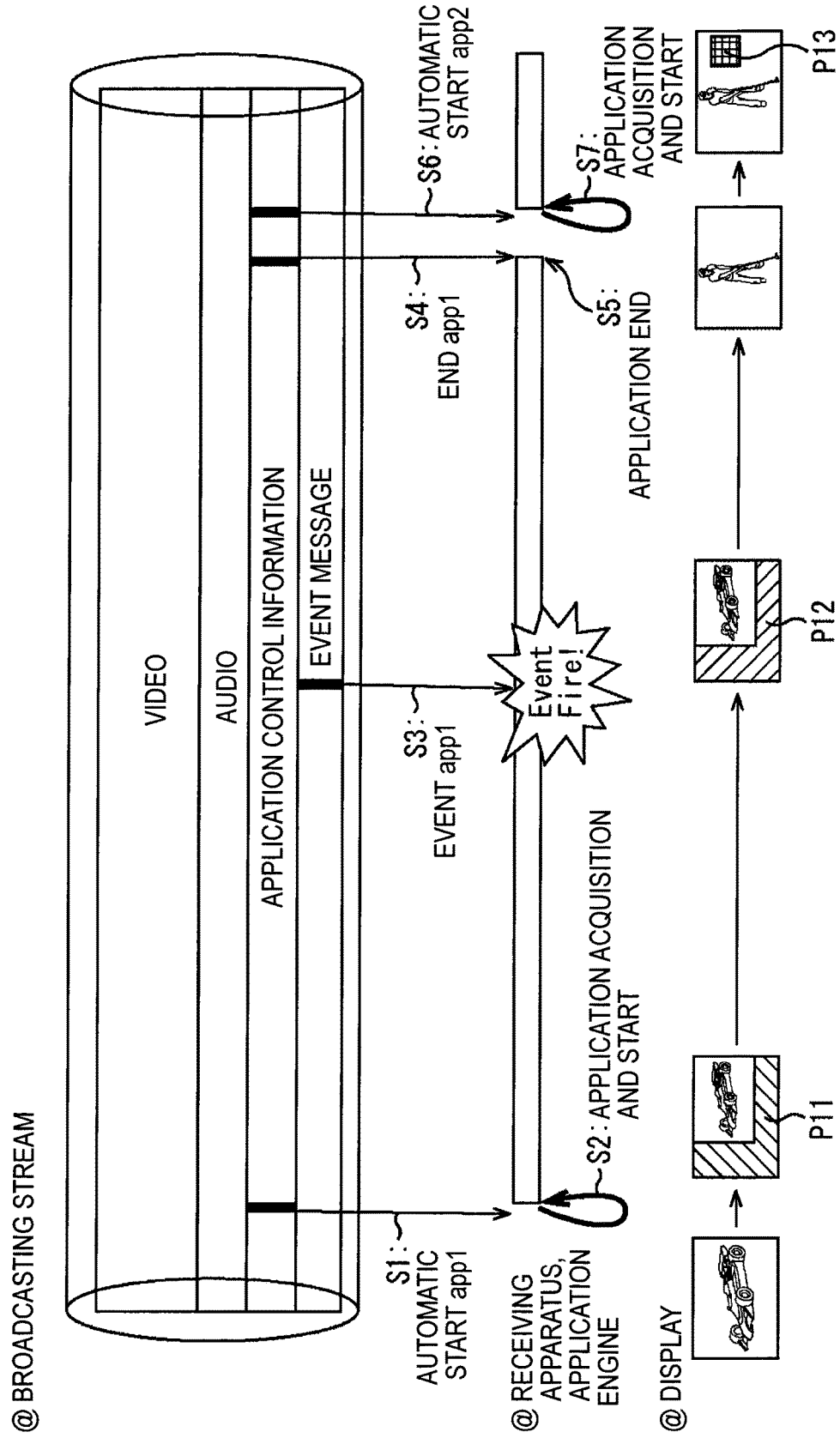

RECEIVING APPARATUS, RECEPTION METHOD, TRANSMITTING APPARATUS, TRANSMISSION METHOD, AND PROGRAM

TECHNICAL FIELD

The present invention relates to a receiving apparatus, a reception method, a transmitting apparatus, a transmission method, and a program and more particularly, to a receiving apparatus, a reception method, a transmitting apparatus, a transmission method, and a program that enable data broadcasting content and an application program executed in linkage with the broadcasting content to be started according to priorities.

BACKGROUND ART

Recently, it has been assumed that a cooperation service of broadcasting and communication to execute an application program distributed through the Internet in linkage with broadcasting content such as a television program is introduced by using not only a broadcasting wave of digital broadcasting but also communication (for example, Patent Literature 1).

In the cooperation service, the application program is produced by a provider producing a general application program who is different from a provider producing broadcasting content.

Meanwhile, data broadcasting based on a BML (Broadcast Markup Language) method is widely performed according to the start of the digital broadcasting. At the present time, almost all receives such as television receivers can correspond to the data broadcasting.

CITATION LIST

Patent Literature

Patent Literature 1: JP2011-66556A

SUMMARY OF INVENTION

Technical Problem

At the present time, it is assumed that the application program distributed in the cooperation service is based on an HTML (Hypertext Markup Language) method. However, in the future, application programs of methods different from the HTML method to be produced by a plurality of providers may be linked with broadcasting content.

In such situation, it is necessary to designate which method of the data broadcasting content of the existing BML method, the application program of the HTML method, and the application program of the method specified in the future is a method to be first started.

However, at the present time, a technical method for designating the method to be first started among such methods is not established.

The present invention has been made in view of the above circumstances and enables data broadcasting content and an application program executed in linkage with the broadcasting content to be started according to priorities.

Solution to Problem

According to a first embodiment of the present technology, there is provided a receiving apparatus including a receiving unit that receives broadcasting content transmitted by a broadcasting wave of digital broadcasting, an acquiring unit that acquires priority information showing priorities of starts between data broadcasting content transmitted by the broadcasting wave and one or more application programs executed in linkage with the broadcasting content, and a control unit that controls the start of the data broadcasting content or the application programs, according to the acquired priority information.

Information showing the priority of the start of the data broadcasting content in the priority information is described in a first descriptor described in a data elementary stream (ES) description area for the data broadcasting content of a program map table (PMT) transmitted by the broadcasting wave, and information showing the priority of the start of the application programs in the priority information is described in application control information to control an operation of the application program.

Information showing whether the data broadcasting content is preferentially started is described in the first descriptor, and information showing start order between a plurality of application programs when the data broadcasting content is not preferentially started is described in the application control information.

The application control information is included in an application information table (AIT) specified by a predetermined standard or XML-AIT obtained by expressing the AIT with XML (Extensible Markup Language).

The priority information is described in a second descriptor described in a program description area of PMT transmitted by the broadcasting wave.

The data broadcasting content and the application program are designated in order of the priorities in the second descriptor.

The priority information is described in a third descriptor in a data ES description area for each of the data broadcasting content and one or more application programs in PMT transmitted by the broadcasting wave.

Information showing whether the data broadcasting content is preferentially started is described in the third descriptor in the data ES description area for the data broadcasting content, and information showing the priorities between the application program and another application program when the data broadcasting content is not preferentially started is described in a third descriptor in each data ES description area to transmit AIT specified by the predetermined standard for the application program.

The application programs are distributed through the Internet.

The transmitting apparatus may be an independent apparatus and may be an internal block configuring one apparatus.

A reception method or a program according to the first aspect of the present invention is a reception method or a program that corresponds to the receiving apparatus according to the first aspect of the present invention.

In the receiving apparatus, the reception method, and the program according to the first aspect of the present invention, the broadcasting content transmitted by the broadcasting wave of the digital broadcasting is received, the priority information showing the priorities of the starts between the data broadcasting content transmitted by the broadcasting wave and one or more application programs executed in linkage with the broadcasting content is acquired, and the start of the data broadcasting content or the application programs is controlled according to the acquired priority information.

According to a second embodiment of the present technology, there is provided a transmitting apparatus including a transmitting unit that transmits broadcasting content transmitted by a broadcasting wave of digital broadcasting, and a generating unit that generates priority information showing priorities of starts between data broadcasting content transmitted by the broadcasting wave and one or more application programs executed in linkage with the broadcasting content. The transmitting unit transmits the generated priority information by the broadcasting wave.

The transmitting apparatus may be an independent apparatus and may be an internal block configuring one apparatus.

A transmission method according to the second aspect of the present invention is a transmission method that corresponds to the transmitting apparatus according to the second aspect of the present invention.

In the transmitting apparatus and the transmission method according to the second aspect of the present invention, the broadcasting content transmitted by the broadcasting wave of the digital broadcasting is transmitted, the priority information showing the priorities of the starts between the data broadcasting content transmitted by the broadcasting wave and one or more application programs executed in linkage with the broadcasting content is generated, and the generated priority information is transmitted by the broadcasting wave.

Advantageous Effects of Invention

According to the first and second aspects of the present invention, data broadcasting content and an application program executed in linkage with the broadcasting content can be started according to priorities.

BRIEF DESCRIPTION OF DRAWINGS

FIG. 4 is a diagram illustrating a structure of AIT.

FIG. 5 is a diagram illustrating items of application control information.

FIG. 6 is a diagram illustrating a basic operation sequence of the receiving apparatus.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Figure 1:
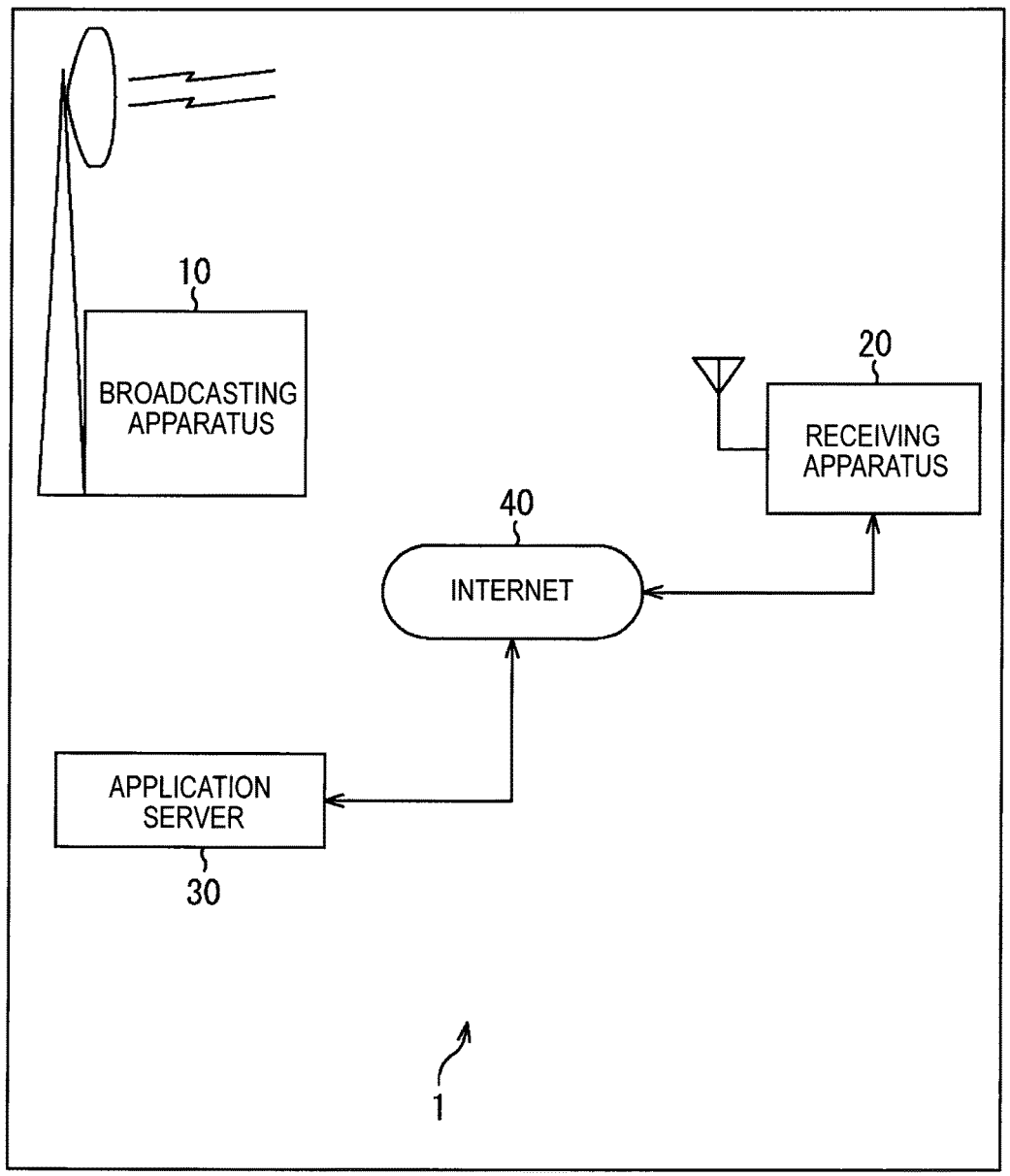
FIG. 1 is a diagram illustrating a configuration of an embodiment of a broadcasting system to which the present invention is applied.

FIG. 1 is a diagram illustrating a configuration of an embodiment of a broadcasting system to which the present invention is applied.

A broadcasting system 1 includes a broadcasting apparatus 10, a receiving apparatus 20, and an application server 30. In addition, the receiving apparatus 20 and the application server 30 are mutually connected through the Internet 40.

The broadcasting apparatus 10 is configured to transmit a broadcasting signal of broadcasting content such as a television program or a CM by a broadcasting wave of digital broadcasting. In addition, the broadcasting apparatus 10 transmits data broadcasting content by a broadcasting wave.

The receiving apparatus 20 receives a broadcasting signal transmitted from the broadcasting apparatus 10 by the broadcasting wave of the digital broadcasting and acquires video and audio of broadcasting content, or video of data broadcasting content. The receiving apparatus 20 outputs the acquired video to a display and outputs the audio to a speaker.

The receiving apparatus 20 may exist as a single body and may be embedded in a television receiver or a video recorder. In addition, the detailed configuration of the receiving apparatus 20 will be described below with reference to FIG. 2.

In addition, the broadcasting apparatus 10 generates application control information to control an operation of the linked application, includes the application control information in the broadcasting signal, and transmits the broadcasting signal.

Here, the linked application is an application program that is executed in linkage with broadcasting content such as a television program and is distributed by an application server 30 connected to the Internet 40.

In the receiving apparatus 20, when a plurality of linked applications of different types such as HTML or Java (registered trademark) are started and it is necessary to distinguish the plurality of linked applications, each of the plurality of linked applications is called a first linked application or a second linked application and is distinguished. In addition, when it is not necessary to distinguish the first linked application and the second linked application from each other, the first and second liked applications are simply called linked applications.

In addition, the application control information is included in AIT (Application Information Table) specified in ARIB STD-B23 and is transmitted. In the application control information, "Auto Start", "Present", "Kill", or "Prefetch" is described as a control command to control an operation of the linked application.

The "Auto Start" is a command that causes the receiving apparatus 20 to automatically execute the linked application immediately. Meanwhile, the "Present" is a command that shows whether the linked application can be executed, when the linked application is not automatically executed and the linked application is executed at any timing according to an external request.

The "Kill" is a command that causes the receiving apparatus 20 to end the execution of the linked application. In addition, the "Prefetch" is a command that causes the linked application to be acquired in advance.

In the application control information, a URL (Uniform Resource Locator) of the application server 30 is described as information of an acquisition destination of the linked application.

In addition, the broadcasting apparatus 10 generates priority information, includes the priority information in a broadcasting signal, and transmits the broadcasting signal. Here, the priority information is information that shows priorities of starts between data broadcasting content and one or more linked applications.

The receiving apparatus 20 controls the start of the data broadcasting content or the linked application, according to the priority information transmitted by a broadcasting wave.

In addition, the receiving apparatus 20 acquires a linked application set to be automatically executed immediately, on the basis of the application control information transmitted by the broadcasting wave, and executes the linked application. At this time, the receiving apparatus 20 has access to the application server 30 through the Internet 40, according to the URL described in the application control information, and acquires the linked application.

The application server 30 manages the linked application. The application server 30 is provided by a broadcaster who broadcasts broadcasting content by the broadcasting apparatus 10 or a provider who produces a linked application.

The application server 30 distributes the managed linked application to the receiving apparatus 20 through the Internet 40, according to an inquiry from the receiving apparatus 20.

The broadcasting system 1 is configured as described above.

[Configuration Example of Receiving Apparatus]

Figure 2:
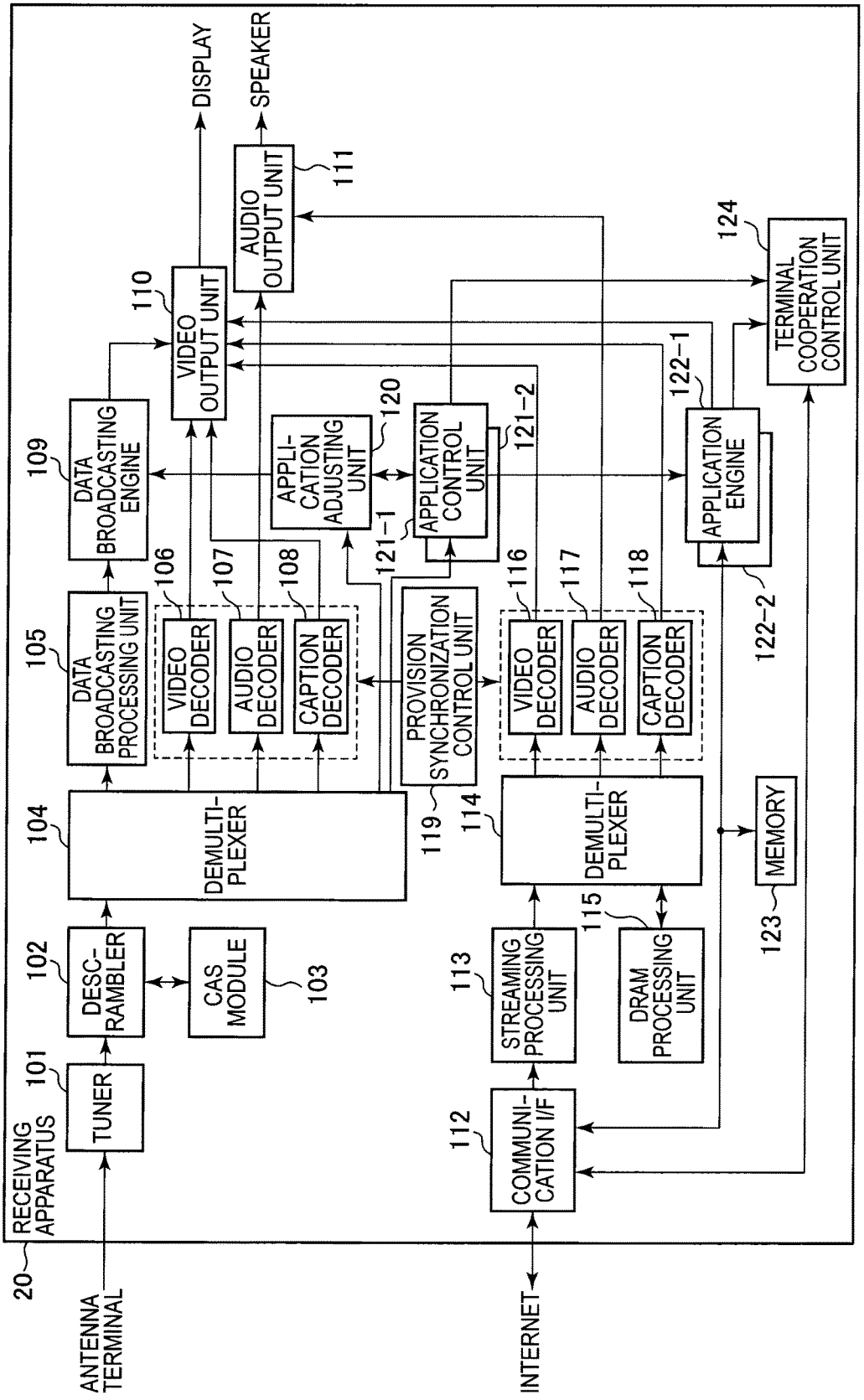
FIG. 2 is a diagram illustrating a configuration of an embodiment of a receiving apparatus to which the present invention is applied.

FIG. 2 is a diagram illustrating a configuration of an embodiment of a receiving apparatus to which the present invention is applied.

The receiving apparatus 20 mainly includes a first block to realize a reception/reproduction function of broadcasting content transmitted by a broadcasting wave of digital broadcasting and a second block to realize a reception/reproduction function of communication content distributed through the Internet 40.

The first block includes a tuner 101, a descrambler 102, a CAS module 103, a demultiplexer 104, a data broadcasting processing unit 105, a video decoder 106, an audio decoder 107, a caption decoder 108, and a data broadcasting engine 109. In addition, the second block includes a communication I/F 112, a streaming processing unit 113, a demultiplexer 114, a DRM processing unit 115, a video decoder 116, an audio decoder 117, and a caption decoder 118.

In addition, a video output unit 110, an audio output unit 111, a provision synchronization control unit 119, an application adjusting unit 120, an application control unit 121, an application engine 122, a memory 123, and a terminal cooperation control unit 124 exist as components to provide functions common to the first and second blocks.

The tuner 101 extracts a broadcasting signal of a channel selection instructed channel from the received broadcasting signal, demodulates the broadcasting signal, and supplies a transport stream obtained as a result thereof to the descrambler 102.

The descrambler 102 descrambles a scrambled transport stream supplied from the tuner 101 and supplies the transport stream to the demultiplexer 104. Information to perform viewing control and contract management of broadcasting content is stored in the CAS (Conditional Access System) module 103. The descrambler 102 refers to the CAS module 103 and descrambles the transport stream scrambled for the purpose of limited reception at the transmission side.

The demultiplexer 104 separates the transport stream supplied from the descrambler 102 into a video stream, an audio stream, caption data, and section data. The demultiplexer 104 supplies the section data, the video stream, the audio stream, and the caption data among the separated streams to the data broadcasting processing unit 105, the video decoder 106, the audio decoder 107, and the caption decoder 108, respectively.

In addition to the stream, a stream for control information is multiplexed to the transport stream. In addition, in the case of MPEG2-TS (Moving Picture Experts Group 2-Transport Stream), information such as PSI/SI is included in the stream for the control information.

The PSI (Program Specific Information) is information that is necessary for a system that selects a specific channel and receives information. The PSI includes PMT. The PMT (Program Map Table) stores each PID (Packet ID) such as an image or audio included in a certain program. In addition, the SI (Service Information) is information such as program information and includes EIT. The EIT (Event Information Table) includes information associated with a program, such as a name, a broadcasting data and time, and broadcasting content of a program.

The data broadcasting processing unit 105 executes various processes for the section data supplied from the demultiplexer 104.

Specifically, the data broadcasting processing unit 105 performs section filtering for a DSM-CC (Digital Storage Media-Command and Control) section transmitted by a carousel transmission method, among the section data. In addition, the data broadcasting processing unit 105 executes an analysis process of DII (Download Info Indication) and DDB (Download Data Block) obtained as a result thereof. The data broadcasting processing unit 105 supplies data such as image data or a BML document included in the DDB to be obtained as a result of the analysis process of the DII and the DDB to the data broadcasting engine 109 in a module unit.

Furthermore, data of the data broadcasting content is transmitted by a data carousel transmission method, for each of objects configuring data called a module.

The data broadcasting engine 109 controls execution of a BML browser, on the basis of the data of the module unit supplied from the data broadcasting processing unit 105, generates a video signal of data broadcasting content, and supplies the video signal to the video output unit 110.

The video decoder 106 decodes the video stream supplied from the demultiplexer 104 and supplies a video signal obtained as a result thereof to the video output unit 110.

The audio decoder 107 decodes the audio stream supplied from the demultiplexer 104 and supplies an audio signal obtained as a result thereof to the audio output unit 111.

The caption decoder 108 decodes the caption data supplied from the demultiplexer 104 and supplies a video signal obtained as a result thereof to the video output unit 110.

The video output unit 110 outputs the video signal supplied from the video decoder 106 to an external display (not illustrated in the drawings). Thereby, video of broadcasting content such as a television program is displayed on the display.

In addition, when the video signal is supplied from the caption decoder 108 or the data broadcasting engine 109, the video output unit 110 synthesizes the video signal with the video signal supplied from the video decoder 106 and outputs a video signal obtained as a result thereof to the display. Thereby, video in which information of data broadcasting such as a caption or a weather forecast is overlapped to a television program is displayed on the display.

The audio output unit 111 outputs the audio signal supplied from the audio decoder 107 to an external speaker (not illustrated in the drawings). Thereby, audio corresponding to video of broadcasting content is output from the speaker.

The communication I/F 112 receives data of streaming reproduction instructed communication content and supplies the data to the streaming processing unit 113.

The streaming processing unit 113 executes various processes necessary for performing streaming reproduction for the communication content supplied from the communication I/F 112 and supplies data obtained as a result thereof to the demultiplexer 114.

The demultiplexer 114 separates the data supplied from the streaming processing unit 113 into a video stream, an audio stream, and caption data. The demultiplexer 114 supplies the video stream, the audio stream, and the caption data among the separated streams to the video decoder 116, the audio decoder 117, and the caption decoder 118, respectively.

The DRM (Digital Rights Management) processing unit 115 executes a process to control the copyright management or the limit of the duplication of communication content. For example, when the streaming reproduction instructed communication content is encrypted, the DRAM processing unit 115 supplies an encryption key to only a receiving apparatus of a user who gets the consent of an author, such that a code is deciphered and streaming reproduction is enabled.

The video decoder 116 decodes the video stream supplied from the demultiplexer 114 and supplies a video signal obtained as a result thereof to the video output unit 110.

The audio decoder 117 decodes the audio stream supplied from the demultiplexer 114 and supplies an audio signal obtained as a result thereof to the audio output unit 111.

The caption decoder 118 decodes the caption data supplied from the demultiplexer 114 and supplies a video signal obtained as a result thereof to the video output unit 110.

The video output unit 110 outputs the video signal supplied from the video decoder 116 to the display. In addition, when the video signal is supplied from the caption decoder 118, the video output unit 110 synthesizes the video signal with the video signal supplied from the video decoder 116 and outputs a video signal obtained as a result thereof to the display. Thereby, video or a caption of communication content is displayed on the display.

The audio output unit 111 outputs the audio signal supplied from the audio decoder 117 to the speaker. Thereby, audio corresponding to the video of the communication content is output from the speaker.

The provision synchronization control unit 119 controls the video decoder 106, the audio decoder 107, and the caption decoder 108, such that the video signal and the audio signal supplied to the video output unit 110 and the audio output unit 111 are synchronized. In addition, the provision synchronization control unit 119 controls the video decoder 116, the audio decoder 117, and the caption decoder 118, such that the video signal and the audio signal supplied to the video output unit 110 and the audio output unit 111 are synchronized.

The application adjusting unit 120 monitors the demultiplexer 104 and acquires the PMT or the AIT separated from the transport stream. The application adjusting unit 120 determines which of the data broadcasting content and the linked application has the highest priority, on the basis of the acquired PMT or AIT.

The application adjusting unit 120 controls the start of the data broadcasting content by the data broadcasting engine 109, on the basis of a corresponding determination result. In addition, the application adjusting unit 120 controls the start of the linked application by the application control unit 121, on the basis of the corresponding determination result.

An application control unit 121-1 controls an application engine 122-1, on the basis of the application control information. The application engine 122-1 controls an operation of a first linked application, according to control from the application control unit 121-1.

An application control unit 121-2 controls an application engine 122-2, on the basis of the application control information. The application engine 122-2 controls an operation of a second linked application, according to control from the application control unit 121-2.

The application control unit 121 and the application engine 122 are provided according to the number of linked applications that can be started in the receiving apparatus 20. In this embodiment, because the two linked applications of the first linked application and the second linked application are exemplified, two application control units and two application engines are provided.

The communication I/F 112 has access to the application server 30 through the Internet 40, according to control from the application engine 122-1, and requests for the first linked application. The communication I/F 112 receives the first linked application distributed from the application server 30 and stores the first linked application by the memory 123.

The application engine 122-1 starts the first linked application stored in the memory 123, according to control from the application control unit 121-1, and controls an operation thereof. For example, when the first linked application is composed of an HTML5 (Hyper Text Markup Language5) document, the application engine 122-1 controls execution of the HTML browser, generates a video signal of the first linked application, and supplies the video signal to the video output unit 110.

In addition, the application engine 122-2 acquires the second linked application from the application server 30 and controls an operation thereof, similar to the application engine 122-1.

When an external apparatus (not illustrated in the drawings) is connected to the receiving apparatus 20, the terminal cooperation control unit 124 executes various processes to cooperate with the external apparatus, according to the control from the application control unit 121 and the application engine 122.

In the configuration example of FIG. 2, the video signal and the audio signal are output to the outside. However, when the receiving apparatus 20 is configured as a television receiver, such signals are supplied to the embedded display and speaker, respectively.

The receiving apparatus 20 is configured as described above.

[Specific Operation Example]

In the receiving apparatus 20, in addition to the data broadcasting content, one or more linked applications start and are overlapped to broadcasting content to be then displayed. However, when these start, start control based on priority information showing the priorities of the start described in the PMT or the AIT transmitted by the broadcasting wave of the digital broadcasting is performed. Next, a specific operation example of the start control based on the priority information will be described with reference to FIGS. 3 to 12.

(Structure of PMT)

Figure 3:
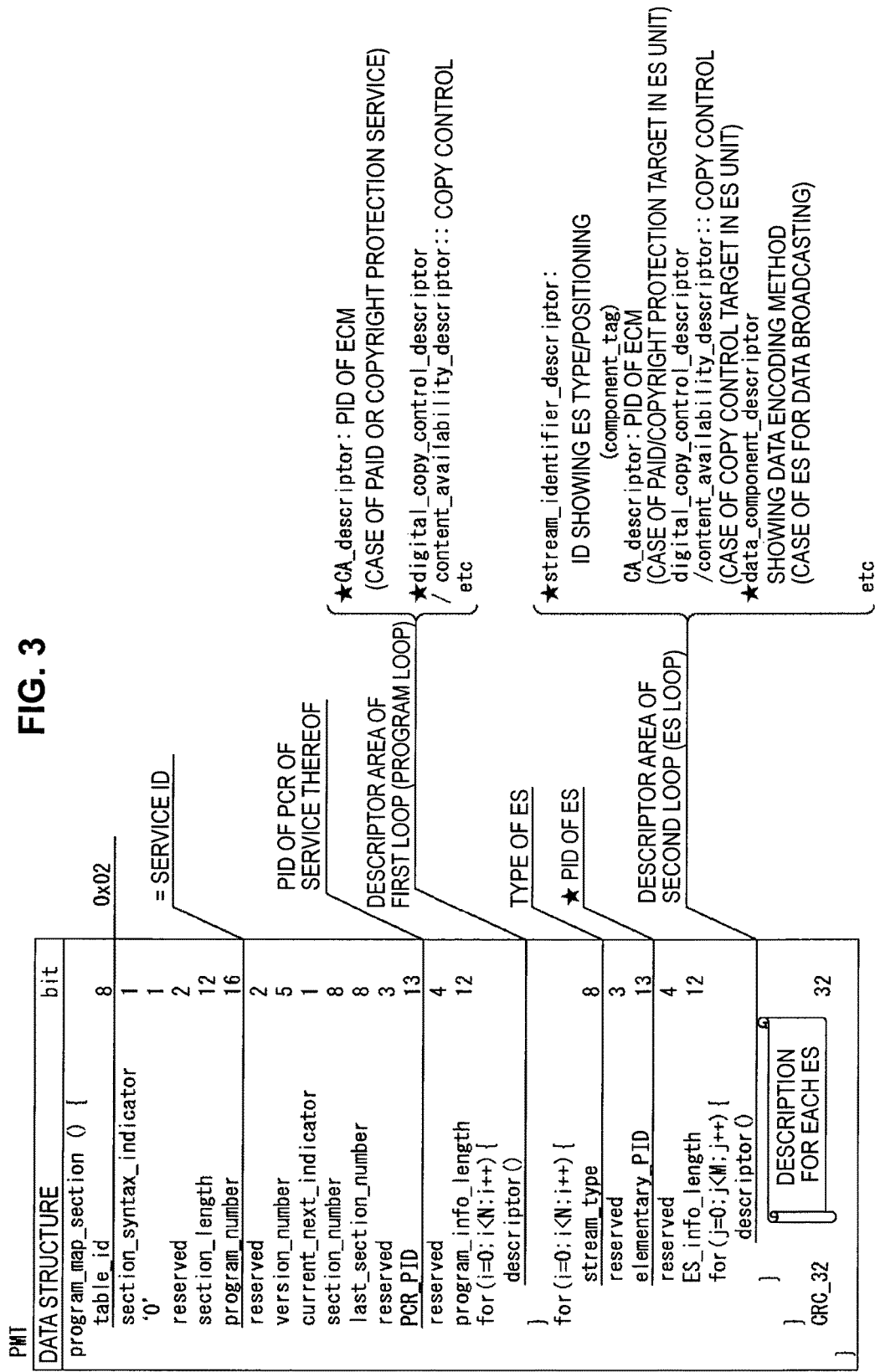
FIG. 3 is a diagram illustrating a structure of PMT.

First, the detail of the PMT will be described with reference to FIG. 3. FIG. 3 is a diagram illustrating a structure of the PMT.

Identification information of the PMT is described in table_id. In addition, "1" is described in section_syntax_indicator.

A section length of the PMT is described in section length. In addition, service_id of a corresponding service is described in program_number.

Version information is described in version_number. "1" is described in current_next_indicator. "0x00" is described in section_number. "0x00" is described in last_section_number.

PID of PCR of the corresponding service is described in PCR_PID. A loop length of a first loop is described in program_info_length. In addition, CA_descriptor to be a descriptor used by a paid/copyright protection service or digital_copy_control_descriptor and content_availability_descriptor to be descriptors used by copy control are described in descriptor( ) in the first loop.

In a second loop, stream_type, elementary_PID, and ES_info_length are described. A stream format identification of a target is described in stream_type. A PID of a TS packet to transmit a payload or an element stream to be associated is described in elementary_PID. A length of the following ES descriptor is described in ES_info_length.

CA_descriptor to be a descriptor used by a paid/copyright protection service in an elementary stream unit or digital_copy_control_descriptor and content_availability_descriptor to be descriptors used by copy control in the elementary stream unit are described in descriptor( ) in the second loop. Furthermore, data_component_descriptor is described as a data encoding method descriptor.

The PMT is configured as described above.

(Structure of AIT)

Next, the detail of the AIT will be described with reference to FIG. 4. FIG. 4 is a diagram illustrating a structure of the AIT.

Identification information of the AIT is described in table_id. "1" is described in section_syntax_indicator. A section length of the AIT is described in section_length.

A value of an application format transmitted by the AIT is described in application_type.

A version number is described in version_number. "1" is described in current_next_indicator. "0x00" is described in section_number. A final section number is described in last_section_number.

A loop length of a common descriptor is described in common_descriptors_length. In addition, a descriptor applied to all of applications in the AIT is described in descriptor( ) in the first loop.

A loop length of application information is described in application_loop_length. In addition, identification information of an application is described in application_identifier( ) in the second loop. In addition, a control code to control a state of an application is described in application_control_code.

An application information descriptor loop length is described in application_descriptors_loop_length. A descriptor applied to only a designated application is described in descriptor( ) in the second loop.

The AIT is configured as described above.

(Application Control Information)

Next, the detail of the application control information will be described with reference to FIG. 5. The application control information is described in the AIT and items illustrated in FIG. 5 are described.

A type of a linked application is described in an application type. HTML5 is fixedly designated in the corresponding type.

Identification information of a provider who provides a linked application is described in a provider ID.

Identification information of a linked application that becomes unique in a specific provider is described in an application ID. That is, the application ID is used in combination with the provider ID, so that the linked application can be uniquely identified.

Control actions for a linked application of a target are described in an application control command. Designation operations such as "Auto Start", "Present", "Kill", and "Prefetch" are described in the control command.

Version information for each of the application types is described in an application specification version.

A profile value showing a function which the linked application requests the receiving apparatus 20 to execute is described in a receiver request function profile. That is, when the receiving apparatus 20 has the function described in the profile value, the receiving apparatus 20 determines that the linked application can be used.

An acquisition destination URL of the linked application is described in an application URL. That is, a URL of the application server 30 is designated in the application URL.

An operation range of the linked application is described in an application boundary. The operation range is designated by boundary information.

For example, a specific domain is designated as the operation range of the linked application in the boundary information. If the operation of the linked application is within a range of the domain, the operation of the linked application is allowed. However, a domain of the acquisition destination URL of the linked application that is described in the application URL can be designated as the boundary information.

Information showing priorities between a type of the first linked application, a type of the data broadcasting content, and a type of the second linked application when the first linked application is started by Auto Start is described in an application system priority. The receiving apparatus 20 starts the data broadcasting content or the linked application of the type in which the priority becomes a maximum value.

A linkage operation range of the linked application is described in an application broadcasting linkage range. The linkage operation range is designated as a bind type.

For example, when a service bound (Service_bound) is designated as the bind type, the linked application links in a predetermined service and operates. In addition, when a provider bound (provider_bound) is designated, the linked application links in the same broadcaster and operates. In addition, when unbound (U-bound) is designated, the linked application links without limitations and operates.

Information showing a broadcasting associated function allowed in the linked application is described in an application allowance function.

Priorities in the same application type are described in an application priority. For example, a value showing which of a plurality of application programs of HTML5 format documents is preferentially executed is designated in the application priority.

A control parameter to disperse application timings of commands and disperse accesses to the application server 30 is described in a server access dispersion parameter.

In the application control information, the application type, the provider ID, the application ID, the application control command, and the application specification version become essential items. In addition, the receiver request function profile, the application URL, the application boundary, the application system priority, and the application broadcasting linkage range become conditional option items. In addition, the application allowance function, the application priority, and the server access dispersion parameter become perfect option items.

In addition, when the application control information is described in the AIT, the provider ID and the application ID are described in application_identifier( ) of AIT of FIG. 4. In addition, the application control command is described in application_control_code of AIT. The other items are basically described in descriptor( ) in the second loop. However, the other items may be described in descriptor( ) in the first loop.

The detail of the application control information has been described.

(Operation Sequence)

Next, a basic operation sequence when the receiving apparatus 20 controls an operation of a linked application according to application control information will be described with reference to FIG. 6.

As illustrated in FIG. 6, in addition to a video stream and an audio stream, application control information and an event message are multiplexed to a broadcasting stream and are transmitted. In FIG. 6, the application control information is described in AIT transmitted by a broadcasting wave.

When a control command of the application control information included in the AIT transmitted by the broadcasting wave designates Auto Start of a linked application app1, the receiving apparatus 20 acquires the application control information (S1).

The receiving apparatus 20 has access to the application server 30 through the Internet 40, according to the acquired application control information, acquires the linked application app1, and starts the linked application (S2). Thereby, video in which video P11 of the linked application app1 is overlapped to video of a television program is displayed on a display.

Then, when the receiving apparatus 20 acquires the event message transmitted by the broadcasting wave, the receiving apparatus 20 ignites an event designated by the event message (S3). Thereby, the video P11 of the linked application app1 that is currently being displayed on the display is switched into video P12.

Then, when the control command of the application control information included in the AIT transmitted by the broadcasting wave designates Kill of the linked application app1, the receiving apparatus 20 acquires the application control information (S4).

The receiving apparatus 20 ends the linked application app1 currently being /executed, according to the acquired application control information (S5). Thereby, the video of the linked application app1 that is overlapped to the video of the television program disappears.

In addition, when the control command of the application control information included in the AIT transmitted by the broadcasting wave designates Auto Start of a linked application app2, the receiving apparatus 20 acquires the application control information (S6).

The receiving apparatus 20 has access to the application server 30 through the Internet 40, according to the acquired application control information, acquires the linked application app2, and starts the linked application (S7). Thereby, video in which video P13 of the linked application app2 is overlapped to the video of the television program is displayed on the display.

As described above, in the receiving apparatus 20, the application control information and the event message transmitted by the broadcasting wave are monitored at all times and the operation of the linked application is controlled according to the control command or the event.

In addition, in the receiving apparatus 20, because the data broadcasting content can start in addition to the start of the linked application, the start control based on the priority information described in the PMT or the AIT is performed.

As methods of describing the priority information, the following three methods exist. That is, a first method of describing the priority information in a program description area of the PMT, a second method of describing the priority information in a data ES description area of the PMT, and a third method of describing the priority information in the data ES description area of the PMT and the AIT exist.

Hereinafter, the first method, the second method, and the third method will be sequentially described.

(First Method)

First, the first method will be described with reference to FIGS. 7 and 8.

Figure 7:
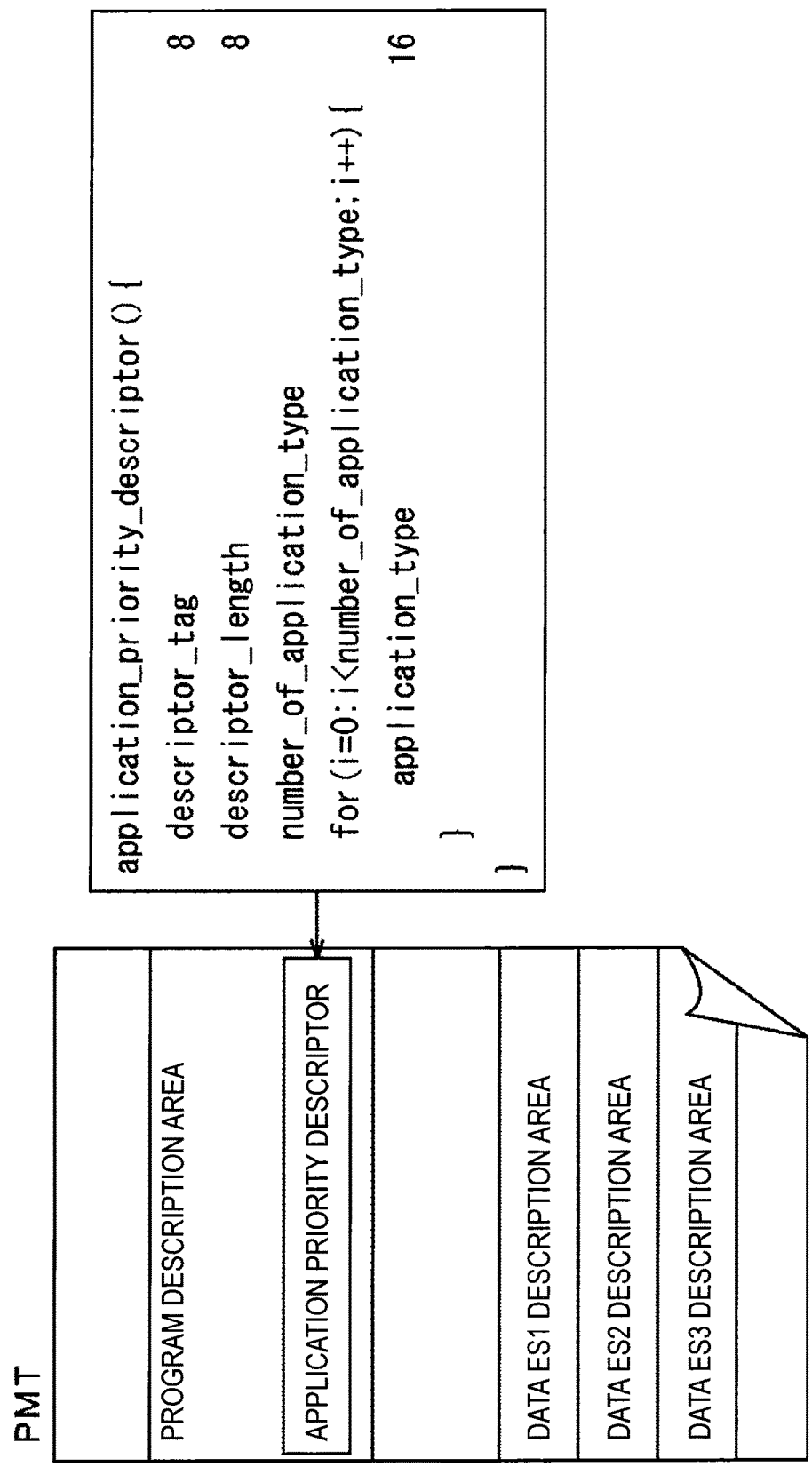
FIG. 7 is a diagram illustrating a description example of PMT in a first method.

FIG. 7 is a diagram illustrating a description example of the PMT according to the first method. In the first method, an application priority descriptor (application_priority_descriptor( ) is described as descriptor( ) in the first loop (in the program description area) in the PMT illustrated in FIG. 3 and the priority information is described therein.

As illustrated in FIG. 7, the following content is described in the application priority descriptor.

A tag value allocated to the corresponding descriptor is described in descriptor_tag. In addition, a descriptor length of the corresponding descriptor is described in descriptor_length.

The number of application types in the loop is described in number_of_application_type.

The application types are described in application_type. That is, the application types are designated in order of the priorities, by the loop of the application types.

However, the value that is designated in the application type corresponds to application_type of the AIT. In addition, a value of a type to be designated does not exist in data broadcasting content of a BML type. Here, information to identify the data broadcasting content is fixedly allocated in advance, so that the receiving apparatus 20 can identify the priority of the data broadcasting content.

In the first method, the PMT is described as described above.

The description content of the application priority descriptor according to the first method is arbitrary and is not limited to the description example of FIG. 7. In addition, in the first method, because the priority information is described in the PMT, the application system priority (FIG. 5) is not described in the AIT.

(Operation Sequence of First Method)

Next, an operation sequence of the receiving apparatus 20 in the first method will be described with reference to FIG. 8.

Figure 8:
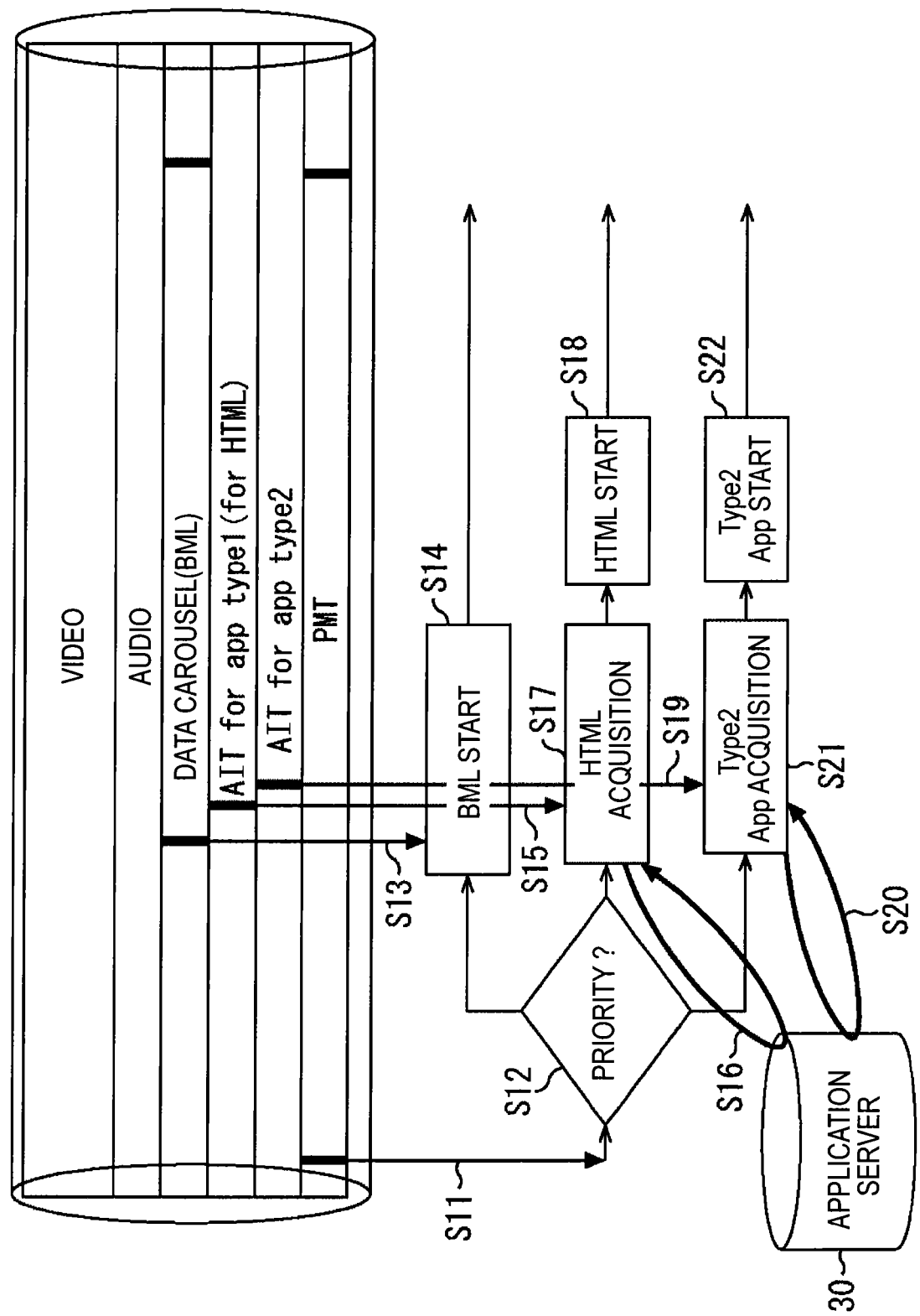
FIG. 8 is a diagram illustrating an operation sequence in the first method

As illustrated in FIG. 8, in addition to the video stream and the audio stream, section data to transmit data broadcasting content by a data carousel transmission method, AIT for a type1, AIT for a type2, and PMT (FIG. 7) are multiplexed to a broadcasting stream. Here, it is assumed that the data broadcasting content is composed of a BML document, a first linked application is composed of the type1

(HTML document), and a second linked application is composed of the type2 (for example, Java (registered trademark)).

In addition, it is assumed that automatic start is set to each of the data broadcasting content, the first linked application, and the second linked application.

In step S11, the application adjusting unit 120 acquires the PMT at selection timing of a television program and holds the PMT.

In step S12, the application adjusting unit 120 determines the priority for each type of the data broadcasting content and the linked application, on the basis of application_type described in the PMT.

When it is determined in step S12 that the priority of the BML document is highest, processes of steps S13 and S14 are executed. That is, the data broadcasting engine 109 acquires data of a module unit transmitted by the data carousel transmission method (S13) and controls execution of a BML browser to start the data broadcasting content (S14). Thereby, the data broadcasting content is preferentially started.

In addition, when it is determined in step S12 that the priority of the HTML document is highest, processes of steps S15 to S18 are executed. That is, the application control unit 121-1 acquires the AIT for the first linked application (S15). In addition, the application engine 122-1 has access to the application server 30, according to the control from the application control unit 121-1 (S16), and acquires the first linked application (S17).

In addition, the application engine 122-1 starts the acquired first linked application, according to the control from the application control unit 121-1 (S18). Thereby, the first linked application is preferentially started.

In addition, when it is determined in step S12 that the priority of a type to be the type2 (for example, Java (registered trademark)) is highest, processes of steps S19 to S22 are executed. That is, the application control unit 121-2 acquires the AIT for the second linked application (S19). The application engine 122-2 has access to the application server 30, according to the control from the application control unit 121-2 (S20), and acquires the second linked application (S21).

In addition, the application engine 122-2 starts the acquired second linked application, according to the control from the application control unit 121-2 (S22). Thereby, the second linked application is preferentially started.

As described above, in the first method, any one of the data broadcasting content, the first linked application, and the second linked application is preferentially started according to the priority for each type designated in application_type described in the application priority descriptor in the program description area of the PMT.

In addition, in the first method, because the priority can be determined on the basis of only the priority information described in the PMT, regardless of the application control information, the start control can be performed, regardless of a provision method of the application control information. When the start control is performed, there is a merit of not applying load to the receiving apparatus 20.

In addition, because the PMT is information transmitted at the frequency of 100 msec or less and is acquired at the time of channel selection, the receiving apparatus 20 can securely acquire a value showing the priority, when the data broadcasting content or the linked application starts. Thereby, the receiving apparatus 20 can immediately determine the priority at the time of the start and preferentially start the target having the high priority.

The first method has been described.
(Second Method)
Next, the second method will be described with reference to FIG. 9.

Figure 9:
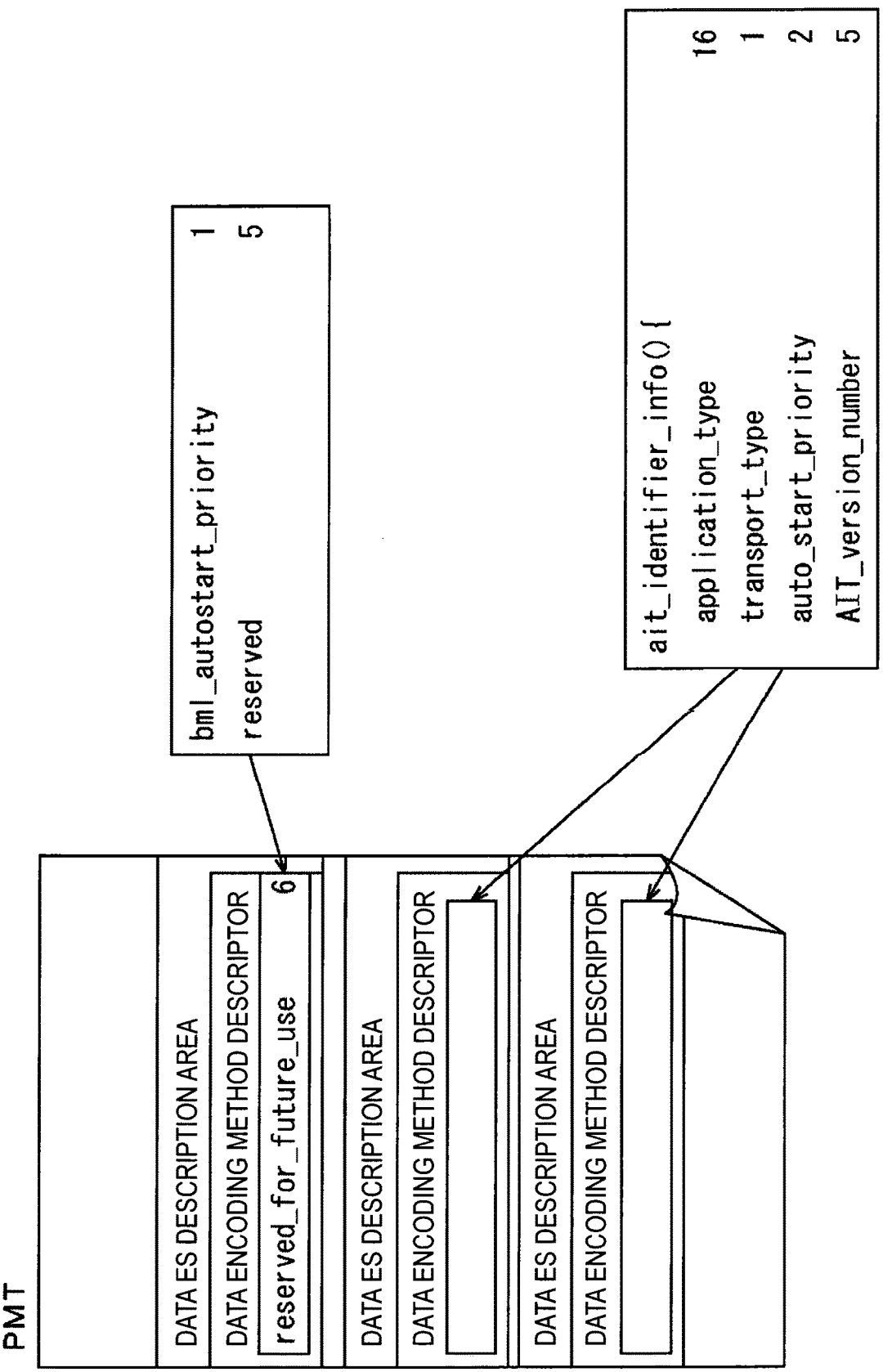
FIG. 9 is a diagram illustrating a description example of PMT in a second method.

FIG. 9 is a diagram illustrating a description example of the PMT according to the second method. In the second method, a data encoding method descriptor (data_component_descriptor) is described in descriptor( ) in the second loop (in a data ES description area for each elementary stream (ES)) in the PMT illustrated in FIG. 3 and the priority information is described therein.

As illustrated in FIG. 9, the following content is described in each data encoding method descriptor.

bml_autostart_priority is described in the data encoding method descriptor described in the data ES description area for the data broadcasting content.

Information showing the priority of the automatic start of the data broadcasting content is described in bml_autostart_priority. For example, when "1" is described, this shows that the data broadcasting content is preferentially started and when "0" is described, this shows that the linked application other than the data broadcasting content is preferentially started.

In addition, ait_identifier_info( ) is described in the data encoding method descriptor described in the data ES description area to transmit the AIT for the first linked application. The following content is described in ait_identifier_info( ).

A type of the linked application operating according to the control command is described in application_type. For example, when HTML5 is designated as the type, an operation for starting the HTML browser in advance and making preparations is enabled in the receiving apparatus 20.

Information showing which method is used to transmit the AIT is described in taransport_type. Here, because the AIT is transmitted as binary data in a stream of an AIT section, information of one bit showing that the AIT is transmitted as the binary data is described.

Furthermore, because the case in which the AIT is transmitted as a file of an XML document by the data carousel transmission method or the case in which the AIT is distributed through the Internet 40 is also assumed, in this case, information of one bit showing which method is used to transmit the AIT is described.

Values showing the priorities between a type of the first linked application and a type of the other linked application (for example, the second linked application) in the case in which the first linked application is automatically started (Auto Start) are described in auto_start_priority.

Version information of the AIT is described in AIT_version_number.

In addition, ait_identifier_info( ) is described in the data encoding descriptor described in the data ES description area to transmit the AIT for the second linked application. Because content of ait_identifier_info( ) is the same as the content described above, explanation thereof is omitted.

That is, in the receiving apparatus 20, when the preferential start of the linked application other than the data broadcasting content is shown by bml_autostart_priority, auto_start_priority of the first linked application and auto_start_priority of the second linked application are compared with each other and the linked application having the high priority is started.

In the second method, the PMT is described as described above.

The description content of the data encoding descriptor according to the second method is arbitrary and is not limited to the description example of FIG. 9. In addition, in the second method, because the priority information is described in the PMT, the application system priority (FIG. 5) is not described in the AIT.

(Operation Sequence of Second Method)

In addition, an operation sequence of the receiving apparatus 20 in the second method will be described. Because the PMT (FIG. 9) is multiplexed to the broadcasting stream, the following processes are executed. That is, in the second method, the same processes are executed, except that the determination process of step S12 is executed on the basis of bml_autostart_priority and auto_start_priority (FIG. 9), instead of application_type (FIG. 7), as compared with the operation sequence in the first method described above.

That is, when it is determined by the determination process that "1" is designated in bml_autostart_priority and the priority of the BML document is highest, the data broadcasting content is preferentially started (S14). In addition, when "0" is designated in bml_autostart_priority and the priority of the HTML document is high as a comparison result of the priorities of the HTML document and Java (registered trademark) based on auto_start_priority, the HTML document is preferentially started (S18). When "0" is designated in bml_autostart_priority and the priority of Java (registered trademark) is high as a comparison result of the priorities of the HTML document and Java (registered trademark) based on auto_start_priority, the linked application programmed by Java (registered trademark) is preferentially started (S22).

As described above, in the second method, any one of the data broadcasting content, the first linked application, and the second linked application is preferentially started according to the priorities of the types designated by bml_autostart_priority and auto_start_priority to be described in the data encoding method descriptor in each data ES description area of the PMT.

In addition, in the second method, because the priority information is described in the data encoding method descriptor in each data ES description area of the PMT, there is a merit of using the existing method as it is.

The second method has been described.

(Third Method)

Finally, the third method will be described with reference to FIGS. 10 and 11.

Figure 10:
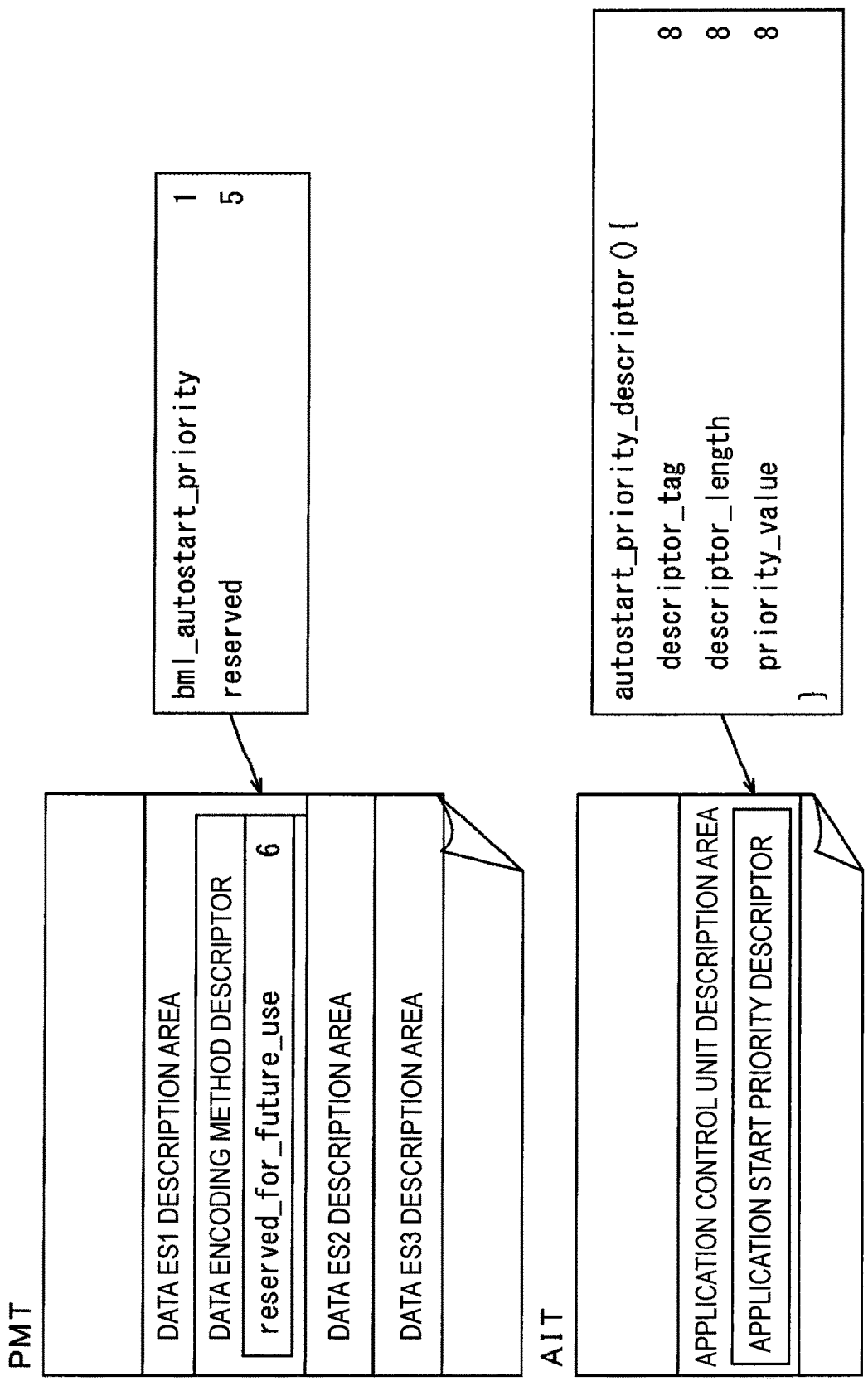
FIG. 10 is a diagram illustrating description examples of PMT and AIT in a third method.

FIG. 10 is a diagram illustrating description examples of the PMT and the AIT according to the third method. In the third method, a data encoding method descriptor (data_component_descriptor) is described as descriptor( ) in the data ES description area for the data broadcasting content in the PMT illustrated in FIG. 3 and the priority information is described therein.

As illustrated in FIG. 10, bml_autostart_priority is described in the data encoding method descriptor. Information showing the priority of the automatic start of the data broadcasting content is described in bml_autostart_priority. For example, when "1" is described, this shows that the data broadcasting content is preferentially started and when "0" is described, this shows that the linked application other than the data broadcasting content is preferentially started.

In the third method, the priority information of the linked application is not described in the PMT.

In the third method, the PMT is described as described above.

In addition, in the third method, an application start priority descriptor (autostart_priority_descriptor( )) is described as descriptor( ) in the second loop (in an application control unit description area) of the AIT illustrated in FIG. 4 and the priority information is described therein.

As illustrated in FIG. 10, the following content is described in the application start priority descriptor.

A tag value allocated to the corresponding descriptor is described in descriptor_tag. In addition, a descriptor length of the corresponding descriptor is described in descriptor_length.

A value that shows the priority of the linked application becoming a target of the corresponding AIT is described in priority_value. As a value of the priority, for example, start order of the linked application is designated. Specifically, when "first" is designated as the start order in the AIT for the first linked application and "second" is designated as the start order in the AIT for the second linked application, the first linked application is preferentially started.

In the third method, the AIT is described as described above.

The description content of the application priority descriptor according to the third method is arbitrary and is not limited to the description example of FIG. 10. In addition, in the description of FIG. 10, the application start priority descriptor is described in the second loop of the AIT (FIG. 4). However, the application start priority descriptor may be described in descriptor( ) in the first loop.

(Operation Sequence of Third Method)

Next, an operation sequence of the receiving apparatus 20 in the third method will be described with reference to FIG. 11.

Figure 11:
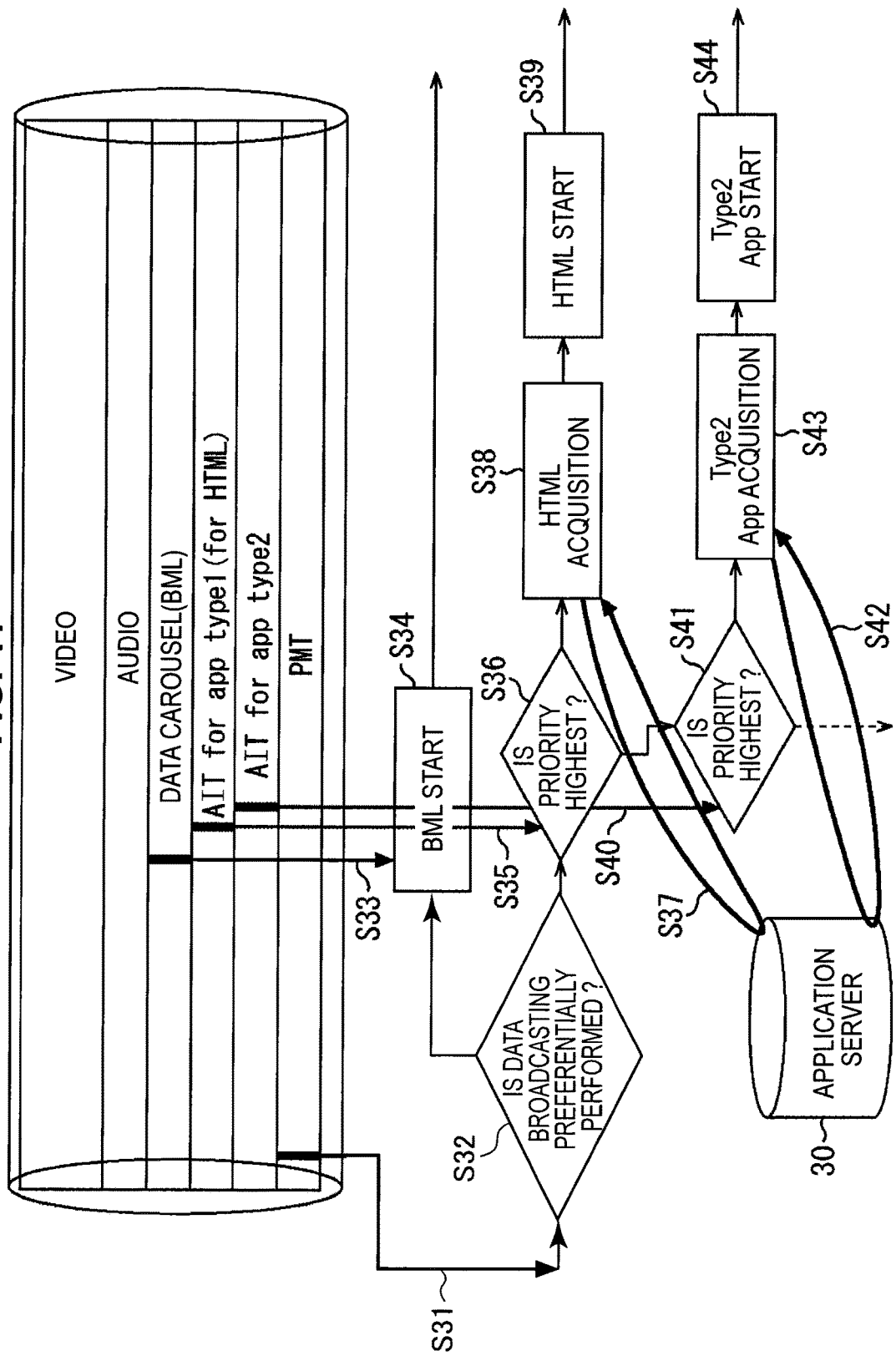
FIG. 11 is a diagram illustrating an operation sequence in the third method.

In FIG. 11, a video stream, an audio stream, section data, AIT for a type1, AIT for a type2, and PMT are multiplexed to a broadcasting stream, similar to FIG. 8. In addition, the data broadcasting content is composed of a BML document, a first linked application is composed of the type1 (HTML document), and a second linked application is composed of the type2 (for example, Java (registered trademark)) and automatic start is set to each of them.

In step S31, the application adjusting unit 120 acquires the PMT at selection timing of a television program and holds the PMT.

In step S32, the application adjusting unit 120 determines whether the automatic start of the data broadcasting content is preferentially performed, on the basis of bml_autostart_priority described in the PMT.

When it is determined in step S32 that the automatic start of the data broadcasting content is preferentially performed, processes of steps S33 and S34 are executed. That is, the data broadcasting engine 109 acquires data of a module unit transmitted by the data carousel transmission method (S33) and controls execution of a BML browser to start the data broadcasting content (S34). Thereby, the data broadcasting content is preferentially started.

In addition, when it is determined in step S32 that the automatic start of the data broadcasting content is not preferentially performed, processes of steps S35 and S36 are executed. That is, the application adjusting unit 120 acquires the AIT for the first linked application (S35). In addition, in step S36, the application adjusting unit 120 determines whether the priority of the first linked application is highest, on the basis of priority_value described in the AIT for the first linked application.

When it is determined in step S36 that the priority of the first linked application is highest (for example, the "first"), processes of steps S37 to S39 are executed. That is, the application engine 122-1 has access to the application server 30, according to the control from the application control unit 121-1 (S37), and acquires the first linked application (S38).

In addition, the application engine 122-1 starts the acquired first linked application, according to the control from the application control unit 121-1 (S39). Thereby, the first linked application is preferentially started.

In addition, when it is determined in step S36 that the priority of the first linked application is not highest (for example, the "second"), processes of steps S40 and S41 are executed. That is, the application adjusting unit 120 acquires the AIT for the second linked application (S40). In step S41, the application adjusting unit 120 determines whether the priority of the second linked application is highest, on the basis of priority_value described in the AIT for the second linked application.

When it is determined in step S41 that the priority of the second linked application is highest (for example, the "first"), processes of steps S42 to S44 are executed. That is, the application engine 122-2 has access to the application server 30, according to the control from the application control unit 121-2 (S42), and acquires the second linked application (S43). In addition, the application engine 122-2 starts the acquired second linked application, according to the control from the application control unit 121-2 (S44). Thereby, the second linked application is preferentially started.

When it is determined in step S32 that the automatic start of the data broadcasting content is not preferentially performed, a method of making an attempt to acquire both the AIT of the first linked application and the AIT of the second linked application at the same time and confirming the priority from the first acquired AIT may be adopted. In addition, in the case in which three or more linked applications exist, when it is determined in step S41 that the priority of the second linked application is not highest, it is determined whether the priority of the third linked application is highest, similar to the above case.

In the case in which the second linked application does not exist and the data broadcasting content and the first linked application are likely to start, when it is determined in step S32 that the automatic start of the data broadcasting content is not preferentially performed, on the basis of bml_autostart_priority of the PMT, the determination process of step S36 is not executed and the first linked application may be started immediately.

As described above, in the third method, first, it is determined whether the data broadcasting content is preferentially started automatically, on the basis of bml_autostart_priority described in the data encoding method descriptor in the data ES description area of the PMT. When it is determined that the data broadcasting content is preferentially started, the data broadcasting content is preferentially started. In addition, when the data broadcasting content is not preferentially started, the start order of the linked application is acquired on the basis of priority_value described in the application start priority descriptor in the application control unit description area of the AIT. When the start order is highest, the linked application of the target is preferentially started.

In addition, in the third method, information described in the PMT can be minimized by using the AIT in addition to the PMT in which important information is described. For this reason, risks involved in operations that are generated by operating the PMT can be avoided. In addition, when the start control is performed, there is a merit of not applying load to the receiving apparatus 20.

When the start control is performed, the PMT transmitted at the frequency of 100 msec or less and the AIT transmitted at the frequency lower than 100 msec become necessary. For this reason, the priority may not be immediately determined when the data broadcasting content or the linked application starts. In actuality, the preferential start of the data broadcasting content can be determined by only the PMT, but the AIT is eventually necessary for controlling the operation of the linked application. Therefore, problems involved in operations rarely occur, even though a waiting state is maintained for several seconds, until the AIT is acquired.

The third method has been described.

Figure 12:
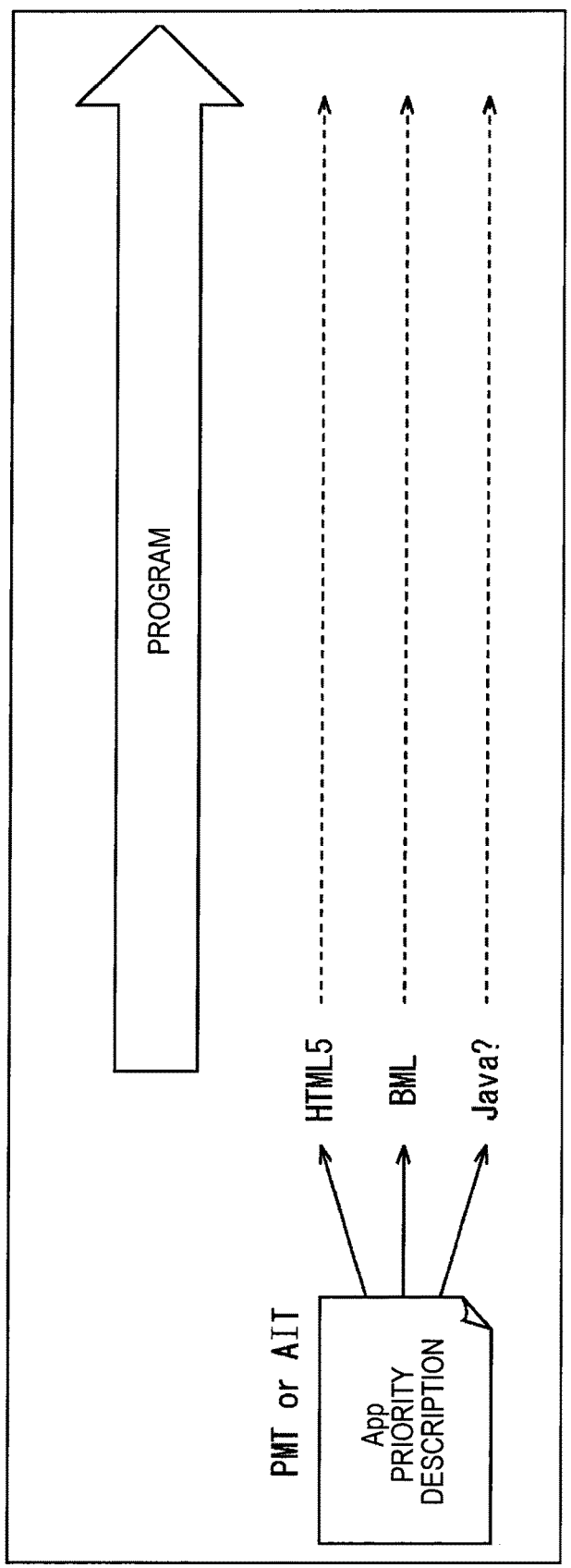
FIG. 12 is a diagram illustrating an example of start order for each type by PMT or AIT.

As described above, the receiving apparatus 20 controls the start of the data broadcasting content and the linked application using any one of the first to third methods. That is, as illustrated in FIG. 12, when the data broadcasting content is based on the BML method, the first linked application is based on the HTML method, and the second linked application is based on Java (registered trademark), the receiving apparatus 20 performs the start control based on the priority information described in the PTM or the AIT and preferentially starts the type having the high priority among the types.

In the above description, the AIT is transmitted as the binary data by the broadcasting wave. However, XML-AIT obtained by expressing the AIT with XML (Extensible Markup Language), which is specified in ETSI TS 102 809, may be adopted. In this case, the XML-AIT is managed by a dedicated server connected to the Internet 40 and is provided according to a request from the receiving apparatus 20. In the above description, the AIT is transmitted for each linked application. However, AITs for a plurality of linked applications can be collectively transmitted.

In the above description, the linked application is executed in linkage with the broadcasting content. However, the linked application may be executed in linkage with communication content streaming-distributed from a dedicated distribution server connected to the Internet 40. Each of the first linked application and the second linked application is exemplary and three or more linked applications of types different from the types of the first and second linked applications may be provided.

[Configuration Example of Computer to Which Present Technology is Applied]

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 13:
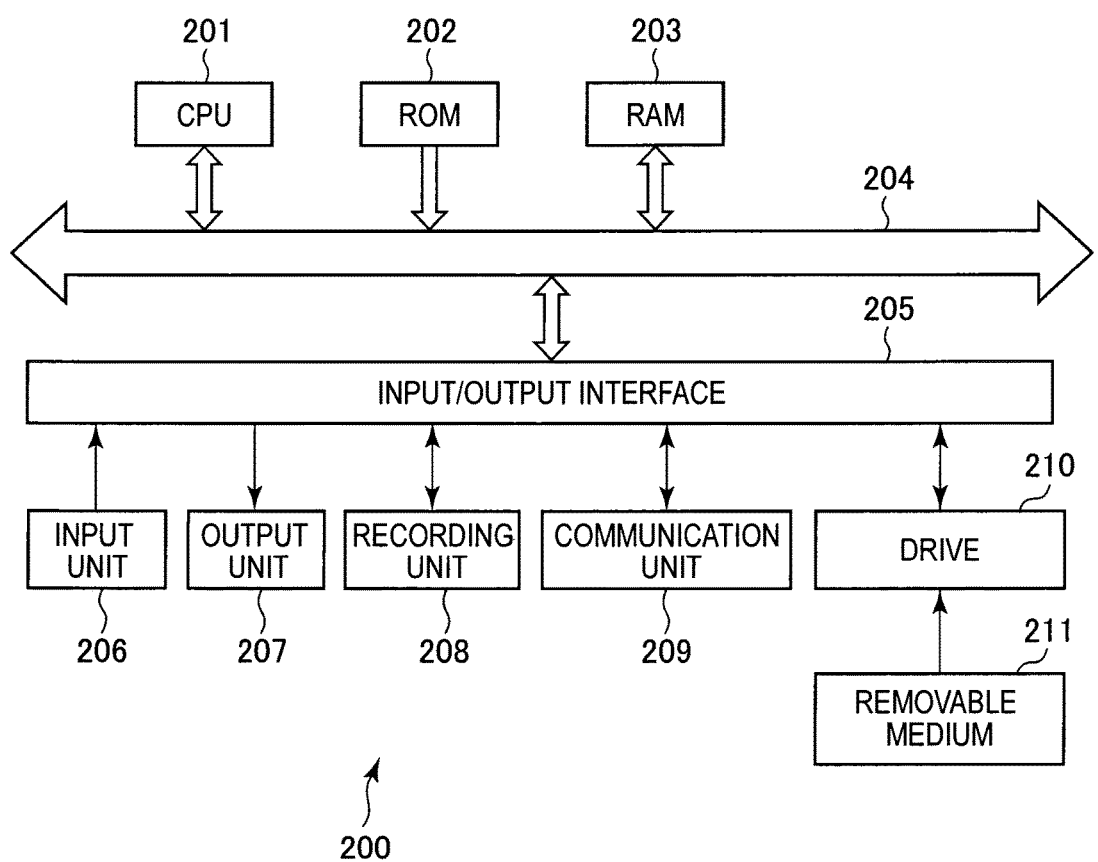
FIG. 13 is diagram illustrating a configuration example of a computer.

FIG. 13 is a block diagram showing a hardware configuration example of a computer that performs the above-described series of processing using a program.

In the computer 200, a central processing unit (CPU) 201, a read only memory (ROM) 202 and a random access memory (RAM) 203 are mutually connected by a bus 204.

An input/output interface 205 is also connected to the bus 204. An input unit 206, an output unit 207, a storage unit 208, a communication unit 209, and a drive 210 are connected to the input/output interface 205.

The input unit 206 is configured from a keyboard, a mouse, a microphone or the like. The output unit 207 is configured from a display, a speaker or the like. The storage unit 208 is configured from a hard disk, a non-volatile memory or the like. The communication unit 209 is configured from a network interface or the like. The drive 210 drives a removable media 211 such as a magnetic disk, an optical disk, a magneto-optical disk, a semiconductor memory or the like.

In the computer 200 configured as described above, the CPU 201 loads a program that is stored, for example, in the storage unit 208 onto the RAM 203 via the input/output interface 205 and the bus 204, and executes the program. Thus, the above-described series of processing is performed.

Programs to be executed by the computer 200 (the CPU 201) are provided being recorded in the removable media 211 which is a packaged media or the like.

Also, programs may be provided via a wired or wireless transmission medium, such as a local area network, the Internet or digital satellite broadcasting.

In the computer 200, by inserting the removable media 211 into the drive 210, the program can be installed in the storage unit 908 via the input/output interface 205. Further, the program can be received by the communication unit 209 via a wired or wireless transmission media and installed in the storage unit 908. Moreover, the program can be installed in advance in the ROM 202 or the storage unit 908.

It should be noted that the program executed by a computer 200 may be a program that is processed in time series according to the sequence described in this specification or a program that is processed in parallel or at necessary timing such as upon calling.

A processing step herein for describing a program which causes the computer 200 to perform various processing does not necessarily have to be processed chronologically in the order described in a flow chart. It also includes processing performed in parallel or individually (for example, parallel processing or processing by an object).

The program may be processed by one computer (processor) or by a plurality of computers in a distributed manner. Further, the program may be performed after being transferred to a remote computer.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1)
A receiving apparatus including:
a receiving unit that receives broadcasting content transmitted by a broadcasting wave of digital broadcasting;
an acquiring unit that acquires priority information showing priorities of starts between data broadcasting content transmitted by the broadcasting wave and one or more application programs executed in linkage with the broadcasting content; and
a control unit that controls the start of the data broadcasting content or the application programs, according to the acquired priority information.

(2)
The receiving apparatus according to (1),
wherein information showing the priority of the start of the data broadcasting content in the priority information is described in a first descriptor described in a data elementary stream (ES) description area for the data broadcasting content of a program map table (PMT) transmitted by the broadcasting wave, and
wherein information showing the priority of the start of the application programs in the priority information is described in application control information to control an operation of the application program.

(3)
The receiving apparatus according to (2),
wherein information showing whether the data broadcasting content is preferentially started is described in the first descriptor, and
information showing start order between a plurality of application programs when the data broadcasting content is not preferentially started is described in the application control information.

(4)
The receiving apparatus according to (2) or (3),
wherein the application control information is included in an application information table (AIT) specified by a predetermined standard or XML-AIT obtained by expressing the AIT with Extensible Markup Language (XML).

(5)
The receiving apparatus according to (1),
wherein the priority information is described in a second descriptor described in a program description area of PMT transmitted by the broadcasting wave.

(6)
The receiving apparatus according to (5),
wherein the data broadcasting content and the application program are designated in order of the priorities in the second descriptor.

(7)
The receiving apparatus according to (1),
wherein the priority information is described in a third descriptor in a data ES description area for each of the data broadcasting content and one or more application programs in PMT transmitted by the broadcasting wave.

(8)
The receiving apparatus according to (7),
wherein information showing whether the data broadcasting content is preferentially started is described in the third descriptor in the data ES description area for the data broadcasting content, and
information showing the priorities between the application program and another application program when the data broadcasting content is not preferentially started is described in a third descriptor in each data ES description area to transmit AIT specified by the predetermined standard for the application program.

(9)

The receiving apparatus according to any one of (1) to (8), wherein the application programs are distributed through the Internet.

(10)

A reception method of a receiving apparatus, the method including:

a step of causing the receiving apparatus to receive broadcasting content transmitted by a broadcasting wave of digital broadcasting;

a step of causing the receiving apparatus to acquire priority information showing priorities of starts between data broadcasting content transmitted by the broadcasting wave and one or more application programs executed in linkage with the broadcasting content; and a step of causing the receiving apparatus to control the start of the data broadcasting content or the application programs, according to the acquired priority information.

(11)

A program for causing a computer to function as:

a receiving unit that receives broadcasting content transmitted by a broadcasting wave of digital broadcasting;

an acquiring unit that acquires priority information showing priorities of starts between data broadcasting content transmitted by the broadcasting wave and one or more application programs executed in linkage with the broadcasting content; and a control unit that controls the start of the data broadcasting content or the application programs, according to the acquired priority information.

(12)

A transmitting apparatus including:

a transmitting unit that transmits broadcasting content transmitted by a broadcasting wave of digital broadcasting; and a generating unit that generates priority information showing priorities of starts between data broadcasting content transmitted by the broadcasting wave and one or more application programs executed in linkage with the broadcasting content, wherein the transmitting unit transmits the generated priority information by the broadcasting wave.

(13)

A transmission method of a transmitting apparatus, the method including:

a step of causing the transmitting apparatus to transmit broadcasting content transmitted by a broadcasting wave of digital broadcasting;

a step of causing the transmitting apparatus to generate priority information showing priorities of starts between data broadcasting content transmitted by the broadcasting wave and one or more application programs executed in linkage with the broadcasting content; and a step of causing the transmitting apparatus to transmit the generated priority information by the broadcasting wave.

REFERENCE SIGNS LIST

1 Broadcasting system
10 Broadcasting apparatus
20 Receiving apparatus
30 Application server
40 Internet
101 Tuner
109 Data broadcasting engine
112 Communication I/F
120 Application adjusting unit
121-1, 121-2, 121 Application control unit
122-1, 122-2, 122 Application engine
200 Computer
201 CPU

The invention claimed is:

1. A receiving apparatus, comprising:
a receiver configured to receive broadcasting content transmitted by a broadcasting wave of digital broadcasting; and
a central processing unit (CPU) configured to:
acquire first start priority information described in a first descriptor arranged in a program map table (PMT) transmitted by the broadcasting wave, wherein the first start priority information indicates a priority of a start of data broadcasting content transmitted by the broadcasting wave;
control the start of the data broadcasting content based on a determination that the start of the data broadcasting content is designated as a top priority in the first start priority information;
acquire second start priority information described in a second descriptor arranged in application control information to control operation of a plurality of application programs executed in linkage with the broadcasting content based on a determination that the start of the data broadcasting content is designated as other than the top priority in the first start priority information, wherein the second start priority information indicates priorities of starts of the plurality of application programs; and
control the starts of the plurality of application programs each of which is acquired from a server on a network based on the priorities of the starts of the plurality of application programs designated in the second start priority information,
wherein the CPU is configured to acquire an application program of the plurality of application programs from the server based on a determination that a priority of the application program is highest based on a priority value of the application program included in the second start priority information.

2. The receiving apparatus according to claim 1,
wherein the first start priority information that indicates the priority of the start of the data broadcasting content is described in the first descriptor described in a data elementary stream (ES) description area for the data broadcasting content of the PMT transmitted by the broadcasting wave.

3. The receiving apparatus according to claim 1,
wherein the application control information is included in an application information table (AIT) specified by a determined standard or XML-AIT obtained by expressing the AIT with Extensible Markup Language (XML).

4. The receiving apparatus according to claim 1,
wherein information that indicates whether the data broadcasting content is preferentially started is described in the first descriptor in a data elementary stream (ES) description area for the data broadcasting content, and
information that indicates the priorities between the plurality of application programs based on a determination that the data broadcasting content is other than preferentially started is described in the second descriptor in each data ES description area to transmit application information table (AIT) specified by a determined standard for each of the plurality of application programs.

5. A reception method, comprising:
in a receiving apparatus:
receiving broadcasting content transmitted by a broadcasting wave of digital broadcasting;
acquiring first start priority information described in a first descriptor arranged in a program map table (PMT) transmitted by the broadcasting wave, the first start priority information indicating a priority of a start of data broadcasting content transmitted by the broadcasting wave;
controlling the start of the data broadcasting content based on a determination that the start of the data broadcasting content is designated as a top priority in the first start priority information;
acquiring second start priority information described in a second descriptor arranged in application control information to control operation of a plurality of application programs executed in linkage with the broadcasting content based on a determination that the start of the data broadcasting content is designated as other than the top priority in the first start priority information, the second start priority information indicating priorities of starts of the plurality of application programs; and
controlling the starts of the plurality of application programs each of which is acquired from a server on a network, according to the priorities of the starts of the plurality of application programs designated in the second start priority information,
wherein an application program of the plurality of application programs is acquired from the server based on a determination that a priority of the application program is highest based on a priority value of the application program included in the second start priority information.

6. A non-transitory computer-readable medium having stored thereon, computer-executable instructions for causing a computer to execute operations, the operations comprising:
receiving broadcasting content transmitted by a broadcasting wave of digital broadcasting;
acquiring first start priority information described in a first descriptor arranged in a program map table (PMT) transmitted by the broadcasting wave, the first start priority information indicating a priority of a start of data broadcasting content transmitted by the broadcasting wave;
controlling the start of the data broadcasting content based on a determination that the start of the data broadcasting content is designated as a top priority in the first start priority information;
acquiring second start priority information described in a second descriptor arranged in application control information to control operation of a plurality of application programs executed in linkage with the broadcasting content based on a determination that the start of the data broadcasting content is designated as other than the top priority in the first start priority information, the second start priority information indicating priorities of starts of the plurality of application programs; and
controlling the starts of the plurality of application programs each of which is acquired from a server on a network based on the priorities of the starts of the plurality of application programs designated in the second start priority information,
wherein an application program of the plurality of application programs is acquired from the server based on a determination that a priority of the application program is highest based on a priority value of the application program included in the second start priority information.

7. A transmitting apparatus, comprising:
a transmitting unit configured to transmit broadcasting content transmitted by a broadcasting wave of digital broadcasting; and
a central processing unit (CPU) configured to:
generate first start priority information described in a first descriptor arranged in a program map table (PMT) transmitted by the broadcasting wave, wherein the first start priority information indicates a priority of a start of data broadcasting content transmitted by the broadcasting wave; and
generate second start priority information described in a second descriptor arranged in application control information to control operation of a plurality of application programs executed in linkage with the broadcasting content based on a determination that the start of the data broadcasting content is designated as other than a top priority in the first start priority information, wherein the second start priority information indicates priorities of starts of the plurality of application programs,
wherein an application program of the plurality of application programs is acquired from a server on a network based on a determination that a priority of the application program is highest based on a priority value of the application program included in the second start priority information.

8. A transmission method, comprising:
in a transmitting apparatus:
transmitting broadcasting content transmitted by a broadcasting wave of digital broadcasting;
generating first start priority information described in a first descriptor arranged in a program map table (PMT) transmitted by the broadcasting wave, the first start priority information indicating a priority of a start of data broadcasting content transmitted by the broadcasting wave; and
generating second start priority information described in a second descriptor arranged in application control information to control operation of a plurality of application programs executed in linkage with the broadcasting content based on a determination that the start of the data broadcasting content is designated as other than a top priority in the first start priority information, the second start priority information indicating priorities of starts of the plurality of application programs,
wherein an application program of the plurality of application programs is acquired from a server on a network based on a determination that a priority of the application program is highest based on a priority value of the application program included in the second start priority information.

9. The receiving apparatus according to claim 1, wherein the CPU is further configured to acquire the first start priority information and the second start priority information, respectively, from the broadcasting wave.

10. The receiving apparatus according to claim 1, wherein the data broadcasting content comprises at least one television program.

* * * * *